(12) United States Patent
Dowaki

(10) Patent No.: US 11,487,095 B2
(45) Date of Patent: Nov. 1, 2022

(54) OPTICAL MICROSCOPE AND SYSTEM INCLUDING ILLUMINATION TO CHANGE FUNCTION OF BIOMATERIAL

(71) Applicant: Sony Corporation, Tokyo (JP)

(72) Inventor: Suguru Dowaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/264,270

(22) PCT Filed: Jul. 19, 2019

(86) PCT No.: PCT/JP2019/028557
§ 371 (c)(1),
(2) Date: Jan. 28, 2021

(87) PCT Pub. No.: WO2020/031668
PCT Pub. Date: Feb. 13, 2020

(65) Prior Publication Data
US 2021/0294085 A1    Sep. 23, 2021

(30) Foreign Application Priority Data

Aug. 9, 2018  (JP) .............................. JP2018-150261

(51) Int. Cl.
*G02B 21/06*  (2006.01)
*G01N 21/64*  (2006.01)
(Continued)

(52) U.S. Cl.
CPC ......... *G02B 21/06* (2013.01); *G01N 21/6428* (2013.01); *G01N 21/6458* (2013.01);
(Continued)

(58) Field of Classification Search
CPC ...... G02B 21/06; G02B 21/16; G02B 21/365; G02B 27/48; G02B 21/004;
(Continued)

(56) References Cited

U.S. PATENT DOCUMENTS

| 6,384,968 B1 * | 5/2002 | Ito .......................... G02B 21/06 |
| | | 359/385 |
| 6,898,004 B2 | 5/2005 | Shimizu et al. |
| | | (Continued) |

FOREIGN PATENT DOCUMENTS

| EP | 2204685 A1 | 7/2010 |
| EP | 2977809 A1 | 1/2016 |
| | (Continued) | |

OTHER PUBLICATIONS

Jiunn-Yuan Lin et al: "Wide-field super-resolution optical sectioning microscopy usine a single spatial light modulator",Journal of Optics. A, Pure and Applied Optics, Institute of Physics Publishing,Bristol, GB,vol. 11, No. 1, Jan. 1, 2009 (Jan. 1, 2009). p. XP020154754,ISSN: 1464-4258, DOI.10.1088/1464-4258/11/1/01530.

(Continued)

*Primary Examiner* — Marnie A Matt
(74) *Attorney, Agent, or Firm* — Wolf, Greenfield & Sacks, P.C.

(57) ABSTRACT

An optical microscope device includes: a first illumination optical system including a light source that emits illumination light for illuminating a specimen an LCOS spatial light modulation element that controls a polarization state of the illumination light, a first illumination optical member that uniformly illuminates the LCOS spatial light modulation element, and a polarization optical element that controls a transmission state of the illumination light directed to the specimen from the LCOS spatial light modulation element in response to the polarization state of the illumination light; a second illumination optical system including a second illumination optical member that images a light flux from the first illumination optical system on a specimen surface;

(Continued)

and an imaging optical system for imaging the specimen surface.

17 Claims, 13 Drawing Sheets

(51) Int. Cl.
  *G02B 21/16* (2006.01)
  *G02B 21/36* (2006.01)
  *G02B 27/48* (2006.01)

(52) U.S. Cl.
  CPC .......... *G02B 21/16* (2013.01); *G02B 21/365* (2013.01); *G02B 27/48* (2013.01); *G01N 2021/6439* (2013.01)

(58) Field of Classification Search
  CPC .......... G02B 21/0064; G02B 21/0068; G02B 21/0076; G02B 21/0084; G02B 21/0092; G02B 21/0032; G01N 2021/6439; G01N 21/6428; G01N 21/6458
  USPC ........................................................ 359/385
  See application file for complete search history.

(56) References Cited

U.S. PATENT DOCUMENTS

| | | | |
|---|---|---|---|
| 8,310,754 | B2 | 11/2012 | Okugawa et al. |
| 8,957,958 | B2 | 2/2015 | Kuppig et al. |
| 2003/0012420 | A1 | 1/2003 | Verwoerd |
| 2003/0063376 | A1 | 4/2003 | Shimizu et al. |
| 2003/0081209 | A1 | 5/2003 | Takahashi et al. |
| 2004/0159772 | A1* | 8/2004 | Cartlidge .......... G01N 21/6458 250/208.1 |
| 2006/0012872 | A1 | 1/2006 | Hayashi et al. |
| 2007/0195272 | A1 | 8/2007 | Hendrix |
| 2007/0263226 | A1 | 11/2007 | Kurtz et al. |
| 2009/0086314 | A1* | 4/2009 | Namba ................. G02B 21/34 359/383 |
| 2010/0182683 | A1 | 7/2010 | Okugawa et al. |
| 2011/0182529 | A1 | 7/2011 | Kempe et al. |
| 2012/0081536 | A1 | 4/2012 | Kuppig et al. |
| 2012/0112098 | A1 | 5/2012 | Hoyt |
| 2013/0010098 | A1 | 1/2013 | Kalkbrenner |
| 2013/0182096 | A1 | 7/2013 | Boccara et al. |
| 2014/0152795 | A1 | 6/2014 | Fujii |
| 2015/0055100 | A1 | 2/2015 | Kaneda |
| 2015/0373312 | A1 | 12/2015 | Miura |
| 2016/0025299 | A1 | 1/2016 | Yamazaki |
| 2017/0031145 | A1 | 2/2017 | Takiguchi |
| 2017/0176338 | A1 | 6/2017 | Wu et al. |
| 2017/0208308 | A1* | 7/2017 | Iguchi .................. G03B 21/204 |
| 2017/0272715 | A1 | 9/2017 | Miura |
| 2020/0166739 | A1 | 5/2020 | Aharoni |
| 2020/0225456 | A1 | 7/2020 | Dowaki |
| 2021/0172876 | A1 | 6/2021 | Fahrbach |

FOREIGN PATENT DOCUMENTS

| | | |
|---|---|---|
| JP | 11-194275 | 7/1999 |
| JP | 2003-107361 A | 4/2003 |
| JP | 2003-130866 A | 5/2003 |
| JP | 2009-109933 A | 5/2009 |
| JP | 2009-282112 A | 12/2009 |
| JP | 2010-152367 A | 7/2010 |
| JP | 2012-078827 A | 4/2012 |
| JP | 2012-098366 A | 5/2012 |
| JP | 2013-190760 A | 9/2013 |
| JP | 2013-238797 A | 11/2013 |
| JP | 2014-112122 A | 6/2014 |
| JP | 2014-146542 A | 8/2014 |
| JP | 2015-200693 A | 11/2015 |
| JP | 2016-025316 A | 2/2016 |
| JP | 2017-156619 A | 9/2017 |
| WO | WO 2014/112212 A1 | 7/2014 |
| WO | WO 2014/119237 A1 | 8/2014 |

OTHER PUBLICATIONS

Pavel K&rcaron:?&zcaron:ek et al:"Flexible structured ill umi nation microscope with a programmable illuminaton array",Opt. Express vol. 20 No. 22,Oct. 12, 2012 (Oct. 12, 2012).24585-24599, XP055394500,DOI: 10.1364/0E.20.024585 Retrieved from the internet:URL: https://www.osapublishing.org/DirectPDFAcces s/52162C F2-CAF2-F148-9A4A4321D3B3354 B 244233/oe-20-22-24585.pdf?da=i&id=244233&seq=O&mobile=no[retrieved on Jul. 28, 2017].
International Search Report and English translation thereof dated Oct. 1, 2019 in connection with International Application No. PCT/JP2019/028557.
U.S. Appl. No. 16/651,286, filed Mar. 26, 2020, Dowaki.
International Search Report and English translation thereof dated Sep. 25, 2018 in connection with International Application No. PCT/JP2018/023180.
International Written Opinion and English translation thereof dated Sep. 25, 2018 in connection with International Application No. PCT/JP2018/023180.
International Preliminary Report on Patentability and English translation thereof dated Apr. 16, 2020 in connection with International Application No. PCT/JP2018/023180.
Extended European Search Report dated Oct. 13, 2020 in connection with European Application No. 18865061.8.
English Translation of the Chinese Office Action dated Jan. 6, 2022 in connection with Chinese Application No. 201880061772.2.
International Written Opinion and English translation thereof dated Oct. 1, 2021 in connection with International Application No. PCT/JP2019/028557.
International Preliminary Report on Patentability and English translation thereof dated Feb. 18, 2021 in connection with International Application No. PCT/JP2019/028557.
Extended European Search Report dated Aug. 9, 2021 in connection with European Application No. 19846152.7.
Wu, Metallographic Analysis Techniques Laboratory Tutorial. 2010:137-42.

* cited by examiner

OPTICAL MICROSCOPE AND SYSTEM INCLUDING ILLUMINATION TO CHANGE FUNCTION OF BIOMATERIAL

CROSS-REFERENCE TO RELATED APPLICATIONS

This application claims the benefit under 35 U.S.C. § 371 as a U.S. National Stage Entry of International Application No. PCT/JP2019/028557, filed in the Japanese Patent Office as a Receiving Office on Jul. 19, 2019, which claims priority to Japanese Patent Application Number JP2018-150261, filed in the Japanese Patent Office on Aug. 9, 2018, each of which is hereby incorporated by reference in its entirety.

TECHNICAL FIELD

The present disclosure relates to an optical microscope device and an optical microscope system.

BACKGROUND ART

Conventionally, various observation devices have been proposed in order to observe states in which positions and shapes of cells change over time. For example, PTL 1 below discloses an observation device capable of changing a photic stimulation position in accordance with positions and shapes of cells and observing cells immediately after photic stimulation and discloses a galvanometer mirror and a digital mirror device (DMD) as a mechanism of changing an application area of illumination light for photic stimulation.

CITATION LIST

Patent Literature

[PTL 1]
JP 2011-257599A

SUMMARY

Technical Problem

However, when performing scanning with illumination light using the galvanometer mirror as in the aforementioned PTL 1, it is difficult to simultaneously apply illumination light to a plurality of points of an observation object. In addition, in the case of the DMD, light easily scatters as stray light when it is turned off due to the mechanism thereof and there is room for improvement in the accuracy with which illumination light is applied to only a position at which illumination light needs to be applied and is not applied to a position at which illumination light does need not be applied.

Accordingly, there is need to realize an illumination method with higher uniformity and accuracy even for specimens including biomaterials changing their functions in response to light.

Therefore, the present disclosure proposes an optical microscope device and an optical microscope system capable of realizing more uniform illumination with higher accuracy even for specimens including biomaterials changing their functions in response to light.

Solution to Problem

According to the present disclosure, there is provided an optical microscope device including: a first illumination optical system including a light source that emits illumination light for illuminating a specimen including biomaterials changing functions in response to light, a liquid crystal on silicon (LCOS) spatial light modulation element that controls a polarization state of the illumination light, a first illumination optical member that uniformly illuminates the LCOS spatial light modulation element, and a polarization optical element that controls a transmission state of the illumination light directed to the specimen from the LCOS spatial light modulation element in response to the polarization state of the illumination light; a second illumination optical system including a second illumination optical member that images a light flux from the first illumination optical system on a specimen surface; and an imaging optical system for imaging the specimen surface, which includes an imaging optical member and an imaging element.

Furthermore, according to the present disclosure, there is provided an optical microscope device including: a first illumination optical system including a light source that emits illumination light for illuminating a specimen, a liquid crystal on silicon (LCOS) spatial light modulation element that controls a polarization state of the illumination light, a first illumination optical member that uniformly illuminates the LCOS spatial light modulation element, and a polarization optical element that controls a transmission state of the illumination light directed to the specimen from the LCOS spatial light modulation element in response to the polarization state of the illumination light; a second illumination optical system including a second illumination optical member that images a light flux from the first illumination optical system on a specimen surface; and an imaging optical system for imaging the specimen surface, which includes an imaging optical member and an imaging element.

Furthermore, according to the present disclosure, there is provided an optical microscope system including; an optical microscope device including a first illumination optical system including a light source that emits illumination light for illuminating a specimen including biomaterials changing their functions in response to light, a liquid crystal on silicon (LCOS) spatial light modulation element that controls a polarization state of the illumination light, a first illumination optical member that uniformly illuminates the LCOS spatial light modulation element, and a polarization optical element that controls a transmission state of the illumination light directed to the specimen from the LCOS spatial light modulation element in response to the polarization state of the illumination light, a second illumination optical system including a second illumination optical member that images a light flux from the first illumination optical system on a specimen surface, and an imaging optical system for imaging the specimen surface, which includes an imaging optical member and an imaging element; a controller that controls an operating state of the optical microscope device; and an image processor that performs image processing on a captured image of the specimen generated by the imaging element.

According to the present disclosure, the first illumination optical system controls a polarization state of illumination light emitted to a specimen through the LCOS spatial light modulation element and guides the illumination light having a controlled polarization state to the second illumination optical system. The second illumination optical system images a light flux from the first illumination optical system on a specimen surface, and the imaging optical system images the specimen surface to which the illumination light is applied.

Advantageous Effects of Invention

As described above, according to the present disclosure, it is possible to realize more uniform illumination with higher accuracy even for specimens including biomaterials changing their functions in response to light.

The aforementioned effects are not necessarily limitative and any effect described in this specification or other effects that may be ascertained from this specification may be obtained in addition to or instead of the aforementioned effects.

DESCRIPTION OF EMBODIMENTS

Figure 1:
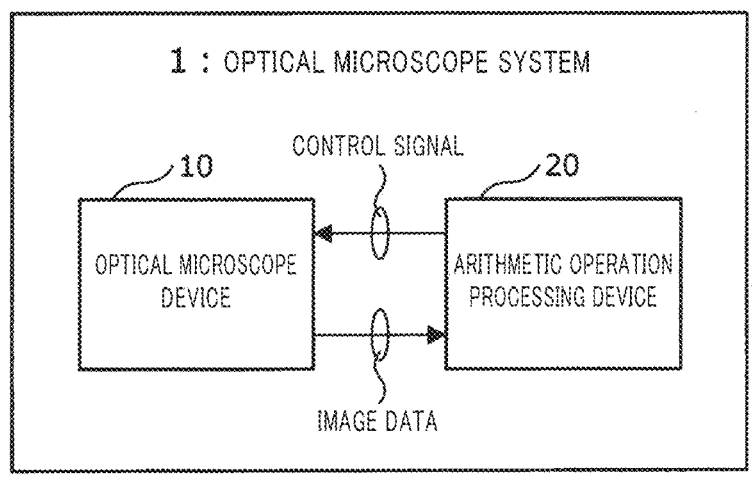
FIG. 1 is an explanatory diagram illustrating an overall configuration of an optical microscope system according to an embodiment of the present disclosure.

Hereinafter, suitable embodiments of the present disclosure will be described in detail with reference to the attached drawings. Meanwhile, components having substantially the same functional configuration are denoted by the same sign and redundant description thereof is omitted in this specification and drawings.

Further, it is assumed that description is performed in the following order.
1. Concerning overall configuration of optical microscope system
2. Concerning optical microscope device
2.1 Concerning first illumination optical system
2.2 Concerning second illumination optical system
2.3 Concerning imaging optical system
2.4 Concerning modified examples
3. Concerning arithmetic operation processing device
3.1 Concerning configuration of arithmetic operation processing device
3.2 Concerning specific examples of processing performed by microscope controller 201 and image processor 205
3.3 Concerning hardware configuration of arithmetic operation processing device
4. Concerning specimen observation method (Concerning Overall Configuration of Optical Microscope System)

First, an overall configuration of an optical microscope system according to an embodiment of the present disclosure will be briefly described with reference to FIG. 1. FIG. 1 is an explanatory diagram illustrating an example of the overall configuration of the optical microscope system according to the present embodiment.

The optical microscope system according to the present embodiment is used to observe biomaterials changing their functions in response to light. As illustrated in FIG. 1, this optical microscope system 1 includes an optical microscope device 10 and an arithmetic operation processing device 20.

The optical microscope device 10 operates under control of the arithmetic operation processing device 20. The optical microscope device 10 images specimens including biomaterials changing their functions in response to light and outputs data of the generated captured image to the arithmetic operation processing device 20. The detailed configuration of this optical microscope device 10 will be described again below.

The arithmetic operation processing device 20 transmits a predetermined control signal to the optical microscope device 10 to integrally control operating states of at least some components of the optical microscope device 10. In addition, the arithmetic operation processing device 20 performs image processing on the data of the captured image of the specimens output from the optical microscope device 10 and provides an obtained image processing result to a user of the optical microscope system 1. Further, the arithmetic operation processing device 20 may also control the operating state of the optical microscope device 10 using the obtained image processing result. The detailed configuration of this arithmetic operation processing device 20 will be described again below. Meanwhile, the arithmetic operation processing device 20 may also control only operating states of some components of the optical microscope device 10. For example, the arithmetic operation processing device 20 may realize an aspect in which the arithmetic operation processing device 20 controls only at least some components of various optical systems (e.g., at least any of a first illumination optical system and an imaging optical system which will be described in detail below) of the optical microscope device 10 and does not control other components (e.g., a stage, an objective lens, and the like) of the optical microscope device 10.

The overall configuration of the optical microscope system according to the present embodiment has been briefly described above with reference to FIG. 1.

(Concerning Configuration of Optical Microscope Device)

Figure 2:
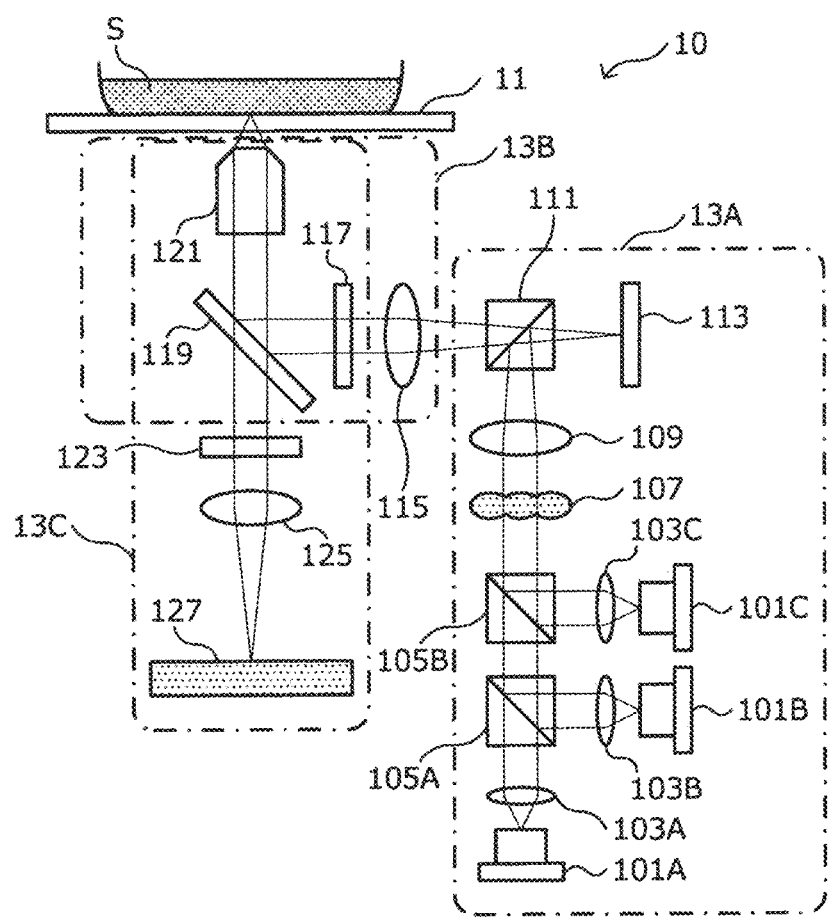
FIG. 2 is an explanatory diagram schematically illustrating an example of an overall configuration of an optical microscope device according to the embodiment.
Figure 3:
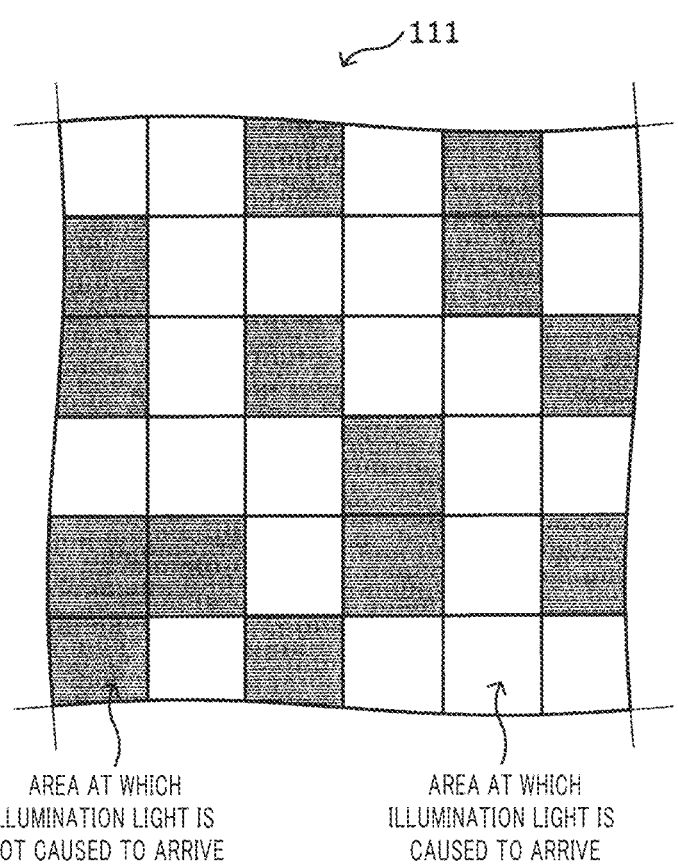
FIG. 3 is an explanatory diagram for describing an LCOS spatial light modulation element in the optical microscope device according to the embodiment.
Figure 4:
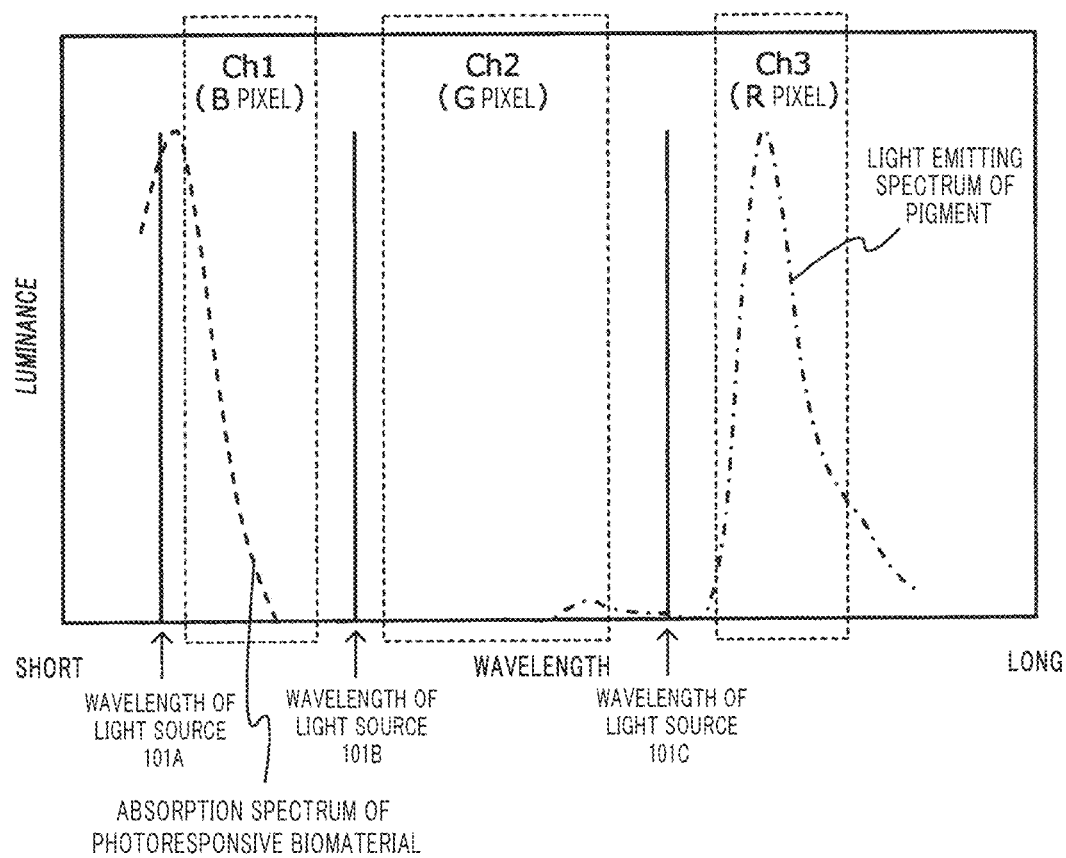
FIG. 4 is an explanatory diagram for describing the optical microscope device according to the embodiment.

Next, a configuration of the optical microscope device according to the present embodiment will be described in detail with reference to FIG. 2 to FIG. 10. FIG. 2 is an explanatory diagram schematically illustrating an example of the overall configuration of the optical microscope device according to the present embodiment. FIG. 3 is an explanatory diagram for describing an LCOS spatial light modulation element in the optical microscope device according to the present embodiment, and FIG. 4 and FIG. 9 are explanatory diagrams for describing the optical microscope device according to the present embodiment. FIG. 5 to FIG. 8 and FIG. 10 are explanatory diagrams schematically illustrating another example of the overall configuration of the optical microscope device according to the present embodiment.

The optical microscope device 10 according to the present embodiment is equipped with a stage 11 on which a specimen including an observation object is placed. The optical microscope device 10 according to the present embodiment may allow observation of even biomaterials changing their functions in response to light while applying light thereto, and a specimen S including biomaterials changing their functions in response to light is provided on the stage 11.

Here, the biomaterials changing their functions in response to light (hereinafter referred to as simply "photoresponsive biomaterials") are not particularly limited and various known biomaterials can be used as observation objects as long as they change their functions in response to light. As such photoresponsive biomaterials, for example, various proteins, lipids, genes, and the like, such as various photoactive proteins represented by channelrhodopsin-2 (ChR2) and the like, and various photoreceptive domains represented by a plant-derived photoreceptive domain (As LOV2, CRY2/CIB1) and the like may be conceived.

To observe the specimen S including the aforementioned photoresponsive biomaterials, the optical microscope device 10 according to the present embodiment includes at least a first illumination optical system 13A, a second illumination optical system 13B, and an imaging optical system 13C, as schematically illustrated in FIG. 2. Hereinafter, these three types of optical systems will be described in detail. Meanwhile, it is possible to satisfactorily observe even a specimen S that does not include the aforementioned photoresponsive biomaterials by using the optical microscope device 10 according to the present embodiment which will be described in detail below.

<First Illumination Optical System 13A>

The first illumination optical system 13A is an optical system that controls an application pattern of illumination light on a specimen S by controlling a polarization state of the illumination light applied to the specimen S. As schematically illustrated in FIG. 2, the first illumination optical system 13A includes a light source 101 (101A, 101B and 101C), an integrator 107 and a condenser lens 109 as examples of first illumination optical system members, a polarized beam splitter 111 as an example of a polarization optical element, and a liquid crystal on silicon (LCOS) spatial light modulation element 113. In addition, it is desirable that the first illumination optical system 13A include a coupling lens (directional angle conversion element) 103 (103A, 103B and 103C) and a dichroic prism 105 (105A and 105B) as an example of a light path combining element in addition to the aforementioned various optical elements.

The light source 101 emits illumination light for applying photic stimulation to photoresponsive biomaterials included in the specimen S. In the optical microscope device 10 according to the present embodiment, it is desirable that such illumination light have a predetermined polarization direction.

In addition, when biomaterials changing their functions in response to light, which further include a luminescent protein that emits light when illumination light having a predetermined wavelength is applied thereto, biomaterials labeled with a predetermined light-emitting pigment, or the like can be used as an observation target, and a light source capable of applying illumination light for causing the aforementioned light emission to occur may be further included as the light source 101. In view of this, it is desirable that one or more light sources 101 be present in the present disclosure although FIG. 2 illustrates a case in which the first illumination optical system 13A includes three types of light sources 101A, 101B and 101C.

Any known light source can be used as the light source 101 as long as it can apply photic stimulation to the photoresponsive biomaterials included in the specimen S or emits light having a wavelength which causes the aforementioned various types of light emission to occur. Although various laser light sources may be conceived as such light sources, for example, it is easy to use a laser diode (LD). This is because linear polarization with high power becomes readily available by using a laser diode. In addition, when a light source that emits non-polarized illumination light that does not have a predetermined polarization state is used, a polarizer that provides a predetermined polarization direction to the non-polarized illumination light may be provided on a light path from the light source 101 to the LCOS spatial light modulation element 113 or a polarizer may be provided in the light source 101 itself in the first illumination optical system 13A. It is assumed that a case in which illumination light having a predetermined polarization state is emitted from the light source 101 will be exemplified in the following description.

In the example illustrated in FIG. 2, illumination light having a predetermined polarization emitted from the light source 101A is input to the coupling lens 103A. Simultaneously, illumination lights having predetermined polarization emitted from the light sources 101B and 101C are respectively input to the coupling lenses 103B and 103C corresponding thereto.

As illustrated in FIG. 2, the coupling lens 103 causes illumination light emitted from each light source 101 to be changed to approximately parallel light and converts the directional angle of the illumination light emitted from each light source 101 such that it is the same as or approaches the directional angle of parallel light. Each coupling lens 103 is disposed at a position to which light within this directional angle from illumination lights emitted from each light source 101 is input. Here, the coupling lens 103 may be composed of a plurality of lenses although FIG. 2 illustrates a case in which the coupling lens 103 is composed of a single lens.

Here, when the optical microscope device 10 includes a plurality of light sources 101, as illustrated in FIG. 2, illumination light emitted from the light sources 101 is combined by the dichroic prism 105 as an example of a light path combining element such that it becomes a single light flux. In the configuration example illustrated in FIG. 2, illumination light that has been emitted from the light source 101A and passed through the coupling lens 103A and illumination light that has been emitted from the light source 101B and passed through the coupling lens 103B are input to the dichroic prism 105A. A mirror having wavelength selectivity is provided inside the dichroic prism 105A. This mirror has wavelength selectivity such that light input from the light source 101A passes through the mirror and light input from the light source 101A is reflected by the mirror. Accordingly, the illumination light projected from the light source 101A and the illumination light emitted from the light source 101B are combined to be a single light flux. The combined illumination light and illumination light that has been emitted from the light source 101C and passed through the coupling lens 103C are input to the dichroic prism 105B. A mirror having wavelength selectivity is also provided inside the dichroic prism 105B. This mirror has wavelength selectivity such that light input from the light source 101A passes through the mirror and light input from the light source 101C is reflected by the mirror. Accordingly, the illumination light emitted from the light source 101C and the illumination light input from the dichroic prism 105A may be combined to become a single light flux.

The illumination light as a single light flux is sequentially input to the integrator 107 and the condenser lens 109 as examples of first illumination optical members. The integrator 107 illuminates the LCOS spatial light modulation element 113 position in the subsequent stage with a uniform intensity distribution. This integrator 107 may include, for example, a plurality of lenses disposed in a predetermined arrangement state (e.g., a matrix form or the like). In general, the light flux emitted from the light source 101 has an ununiform intensity distribution (luminance distribution) in a plane perpendicular to the progress direction thereof. Accordingly, when this light flux is guided to the LCOS spatial light modulation element 113 as it is, the intensity distribution in the LCOS spatial light modulation element 113 becomes ununiform. On the contrary, if the light flux emitted from the light source 101 is split into a plurality of light fluxes by the integrator 107 and the split light fluxes are guided to the LCOS spatial light modulation element 113 in an overlapping manner, the intensity distribution on the LCOS spatial light modulation element 113 may become uniform (in other words, ununiformity of intensity distribution may be reduced). As a result, when a plurality of photoresponsive biomaterials present at a plurality of positions in the specimen S are illuminated, it is possible to illuminate the plurality of photoresponsive biomaterials concerned with the same intensity of application.

In addition, the condenser lens 109 guides the plurality of light fluxes split by the integrator 107 to the LCOS spatial light modulation element 113 in an overlapping manner. The condenser lens 109 is not particularly limited and one having an arbitrary configuration can also be used.

Meanwhile, although FIG. 2 illustrates a case in which the integrator 107 is composed of a single fly-eye lens, the integrator 107 may be composed of a pair of fly-eye lenses. In addition, although FIG. 2 illustrates a case in which the condenser lens 109 is composed of a single lens, the condenser lens 109 may be composed of a plurality of lenses.

The polarized beam splitter 111 as an example of a polarization optical element controls a transmission state of illumination light directed from the LCOS spatial light modulation element 113 to the specimen S in response to a polarization state of the illumination light. Specifically, the polarized beam splitter 111 reflects the light flux (i.e., light flux having the same polarization direction as the illumination light) input from the light source 101 to the LCOS spatial light modulation element 113. In addition, with respect to light fluxes input from the LCOS spatial light modulation element 113, the polarized beam splitter 111 reflects a light flux having the same polarization direction as the illumination light to the light source 101 and transmits a light flux different from the illumination light (e.g., in a polarization state orthogonal to the illumination light) to the specimen S.

As will be described in detail below, it is possible to prevent unnecessary illumination light from being applied to the specimen S by combining and using the polarized beam splitter 111 and the LCOS spatial light modulation element 113.

The LCOS spatial light modulation element 113 two-dimensionally modulates the light flux that has passed through the condenser lens 109 such that a desired application state (i.e., application pattern) of the illumination light on the specimen surface on the stage 11 is realized. In the present embodiment, the LCOS spatial light modulation element 113 is disposed on a light path of the first illumination optical system 13A such that it is located at a position optically conjugate with respect to the specimen surface of the specimen S.

The LCOS spatial light modulation element 113 is a spatial light modulation element having a structure in which liquid crystal is disposed on a silicon substrate, and pixels are constructed in such a manner that an electronic address circuit is constructed on the silicon substrate and a known electrode metal such as aluminum is provided on the uppermost layer through a known semiconductor technology. In this LCOS spatial light modulation element 113, the phase of incident light can be independently controlled in units of pixels by controlling liquid crystal alignment for each pixel. The LCOS spatial light modulation element 113 having the aforementioned structure has a high aperture ratio and thus can illuminate the specimen S mounted on the stage 11 without a gap.

The LCOS spatial light modulation element 113 may be configured, for example, as a liquid crystal panel using a twisted nematic (TN) type liquid crystal (liquid crystal molecules having positive refractive index anisotropy). Specifically, the LCOS spatial light modulation element 113 has a structure in which a liquid crystal layer using a TN mode liquid crystal is sandwiched between a pair of substrates on which a driving voltage based on an application pattern of illumination light is applied to each of a plurality of pixels disposed in a matrix form.

In such an LCOS spatial light modulation element 113, light modulation is performed as described below at the time of a driving voltage not being applied and at the time of application of a driving voltage, respectively, when the TN type liquid crystal is used as described above.

A case in which a driving voltage is not applied to the pixels of the LCOS spatial light modulation element 113 (a case in which application based on an application pattern is performed) may be conceived. In this case, the LCOS spatial light modulation element 113 has characteristics in which the TN type liquid crystal is twisted and aligned to cause a phase difference in the incident plane with respect to light input to pixels and the light is emitted with a polarization axis rotated approximately 90 degrees. That is, when the driving voltage is not applied, light modulation is performed while reflecting the light input to the pixels such that the state of polarized light at the time of input of the light is orthogonal to the state of polarized light at the time of emission of the light (e.g., light input as an S-polarized light is emitted as a P-polarized light).

Next, a case in which a driving voltage is applied to the LCOS spatial light modulation element 113 (a case in which application based on the application pattern is not performed) may be conceived. In this case, the LCOS spatial light modulation element 113 has characteristics in which liquid crystal molecules are aligned overall in the thickness direction of the element and thus do not cause a phase difference in the incident plane with respect to light input to the pixels and the light input to the pixels is emitted with a polarization axis maintained. That is, when the driving voltage is applied, light modulation is performed while reflecting the light input to the pixels such that the state of polarized light at the time of input of the light is parallel to the state of polarized light at the time of emission of the light (e.g., light input as an S-polarized light is emitted as an S-polarized light).

In this manner, polarization of the illumination light emitted from the LCOS spatial light modulation element 113 is different between when a driving voltage is not applied and when a driving voltage is applied. It is possible to apply illumination light to a desired position in the specimen S and reliably prevent the illumination light from arriving at a position at which the illumination light need not be applied by combining the polarization characteristics of the LCOS spatial light modulation element 113 with optical characteristics in the polarized beam splitter 111 after performing control such that the polarization characteristics have a desired state in each pixel of the LCOS spatial light modulation element 113, as schematically illustrated in FIG. 3. That is, site-specific illumination with high accuracy is realized by combining the LCOS spatial light modulation element 113 and the polarized beam splitter 111.

Meanwhile, the liquid crystal panel included in the LCOS spatial light modulation element 113 is not limited to the aforementioned TN type liquid crystal panel, and liquid crystal panels using other types of liquid crystal may be provided. Specifically, a liquid crystal panel using a liquid crystal of a vertical alignment (VA) type, a super twisted nematic (STN) type, an in-plane switching (IPS) type, an optically compensated bend (OCB) type, a multi-domain vertical alignment (MVA) type, an axially symmetric aligned micro-cell (ASM) type, or the like may be provided in the LCOS spatial light modulation element 113, for example. In addition, a liquid crystal panel using a smectic liquid crystal (e.g., ferroelectric liquid crystal, and the like) other than a nematic liquid crystal may be provided in the LCOS spatial light modulation element 113.

Here, it may be conceived that a digital micromirror device (DMD) be used as a spatial light modulation element other than the LCOS spatial light modulation element. However, since a DMD is an element that performs light modulation by continuously changing a direction in which a micromirror faces, light scatters to easily becomes stray light when it is turned off due to a mechanism thereof. On the other hand, since an observation object with which the present embodiment is concerned is a photoresponsive biomaterial, whether illumination light is applied to such a biomaterial or not needs to be strictly distinguished for observation accuracy. Here, when a DMD is used as a spatial light modulation element, stray light that is not intended by a user is likely to be unknowingly applied to the photoresponsive biomaterial to cause unintended observation accuracy reduction. Accordingly, the aforementioned LCOS spatial light modulation element is used as a spatial light modulation element in the optical microscope device 10 according to the present embodiment.

The light flux of the illumination light which has a polarization state controlled by the LCOS spatial light modulation element 113 and has passed through the polarized beam splitter 111 is guided from the first illumination optical system 13A to the second illumination optical system 13B.

<Second Illumination Optical System 13B>

The second illumination optical system 13B is an optical system that images the light flux of illumination light from the first illumination optical system 13A on the specimen S (more specifically, the specimen surface). This second illumination optical system 13B includes a condenser lens 115 and an objective lens 121 as examples of second illumination optical members. In addition, it is desirable that the second illumination optical system 13B include a band pass filter 117 and a dichroic mirror 119 in addition to the aforementioned optical elements.

The light flux of illumination light from the first illumination optical system 13A is input to the condenser lens 115. The condenser lens 115 couples the uniform light flux of illumination light from the LCOS spatial light modulation element 113 to the objective lens 121 which will be described later. Here, the condenser lens 115 according to the present embodiment is not particularly limited and various known condenser lenses may be used. In addition, although FIG. 2 illustrates a case in which a single condenser lens 115 is used, the condenser lens 115 may be composed of a plurality of lenses.

The light flux of illumination light that has passed through the condenser lens 115 is input to the dichroic mirror 119 via the band pass filter 117. The band pass filter 117 reflects light with a specific wavelength band and transmits light with other wavelength bands. When the light flux of illumination light passes through the band pass filter 117, illumination light with a desired wavelength band can be applied to the specimen surface and light with unintended wavelength bands can be prevented from being applied to the specimen surface. The band pass filter 117 is not particularly limited, and an appropriate one may be appropriately installed in response to the wavelength band of illumination light emitted from the light source 101 provided in the optical microscope device 10 according to the present embodiment.

The dichroic mirror 119 is a mirror that transmits half of incident light and reflects half thereof. When the light flux of illumination light is input to the dichroic mirror 119, the light flux of illumination light is coupled to the objective lens 121. Meanwhile, the dichroic mirror 119 is not particularly limited and various known dichroic mirrors may be used.

The objective lens 121 images the light flux of illumination light coupled through the condenser lens 115 on the specimen surface of the specimen S. Here, the objective lens 121 according to the present embodiment is not particularly limited and various known objective lenses may be used. In addition, although FIG. 2 illustrates a single objective lens 121, the optical microscope device 10 according to the present embodiment may include a plurality of objective lenses 121.

Through the above-described second illumination optical system 13B, the light flux of illumination light is imaged on the specimen surface of the specimen S. Here, since the LCOS spatial light modulation element 113 and the specimen surface are in an optically conjugate relationship, as mentioned above, in the optical microscope device 10 according to the present embodiment, the illumination light is applied to the specimen surface with an application pattern (the application pattern illustrated in FIG. 3 and the like) realized by the LCOS spatial light modulation element 113 maintained.

Accordingly, the biomaterials changing their functions in response to light (photoresponsive biomaterials) present in the specimen S change their functions, when light with a wavelength band appropriate to change these functions is present in the illumination light, in response to the light with such a wavelength band. The state of change in the functions in the photoresponsive biomaterials is guided to an imaging element by the imaging optical system 13C which will be described in detail below and recorded as an image.

In addition, when the photoresponsive biomaterials in the specimen S include a luminescent protein that emits light when illumination light having a predetermined wavelength is applied thereto or are labeled with a predetermined light-emitting pigment, a case in which light with a wavelength band appropriate to change the functions and light with a wavelength band appropriate to cause the luminescent protein and the light-emitting pigment to react are present in illumination light may be conceived. In this case, the luminescent protein at a position to which the illumination light is applied emits light to apply fluorescence or phosphorescence or the light-emitting pigment used for a label is excited to apply fluorescence or phosphorescence and, additionally, the photoresponsive biomaterials change their functions. Accordingly, an observer can clearly identify the photoresponsive biomaterials to which the illumination light is applied using the applied fluorescence or phosphorescence. The state of change in the functions in the photoresponsive biomaterials is guided to an imaging element by the imaging optical system 13C which will be described in detail below and recorded as an image.

For example, it may be assumed that the optical microscope device 10 includes three types of light sources 101A to 101C, as schematically illustrated in FIG. 2, and photoresponsive biomaterials concerned change their functions in response to illumination light with a wavelength band emitted from the light source 101A, as schematically illustrated in FIG. 4, for example. Since many photoresponsive biomaterials do not emit light when changing their functions, a user cannot ascertain whether the illumination light has certainly been applied to the photoresponsive biomaterials concerned. In addition, cases in which illumination light needs to be individually applied to cells in a specimen in which a plurality of single cells having photoresponsivity are present, and the like may occur, for example.

Accordingly, photoresponsive biomaterials are labeled in advance using a light-emitting pigment (e.g., fluorochrome) that emits light in response to illumination light with a wavelength band emitted from the light source 101B or 101C, as illustrated in FIG. 4, for example. Accordingly, the light-emitting pigment emits light according to the illumination light from the light source 101B or 101C, and thus an observer can ascertain the positions of the photoresponsive biomaterials concerned and certainly apply the illumination light to the photoresponsive biomaterials concerned.

<Imaging Optical System 13C>

The imaging optical system 13C is an optical system for imaging the specimen surface of the specimen S mounted on the stage 11, which includes imaging optical members and an imaging element. The imaging optical system 13C includes the objective lens 121 and an imaging lens 125 as examples of imaging optical members and an imaging element 127. In addition, it is desirable that the imaging optical system 13C include the dichroic mirror 119 and a band pass filter 123.

A light flux from the specimen surface is condensed by the objective lens 121 that also serves as the second illumination optical system 13B and passes through the dichroic mirror 119 that also serves as the second illumination optical system 13B. Thereafter, the light flux from the specimen surface is input to the band pass filter 123.

The band pass filter 123 reflects light with a specific wavelength band and transmits light with other wavelength bands. It is possible to image only a light flux with a desired wavelength band on the imaging element 127 by transmitting the light flux from the specimen surface through the band pass filter 123. The band pass filter 123 is not particularly limited and a suitable one may be appropriately provided in response to a wavelength band of illumination light emitted from the light source 101 provided in the optical microscope device 10 according to the present embodiment and a wavelength band of light emission that may occur from the specimen S.

The light flux from the specimen surface that has passed through the band pass filter 123 is input to the imaging lens 125. The imaging lens 125 images the light flux from the specimen surface condensed by the objective lens 121 on the imaging element 127. In the optical microscope device 10 according to the present embodiment, the imaging lens 125 may have an arbitrary configuration.

As described above, since the second illumination optical system 13B and the imaging optical system 13C share the objective lens 121, a magnification ratio can be determined by a ratio of a focal distance of the condenser lens 115 to a focal distance of the imaging lens 125, and the like. Accordingly, it is based on pixel sizes of the LCOS spatial light modulation element 113 and the imaging element 127 or device sizes of the LCOS spatial light modulation element 113 and the imaging element 127 which are determined by "pixel size×number of pixels".

For example, when the pixel sizes of the LCOS spatial light modulation element 113 and the imaging element 127 are respectively 6 μm and 3 μm, and pixel sizes projected on the specimen surface need to be equalized (=1:1), the ratio of the focal distance of the condenser lens 115 to the focal distance of the imaging lens 125 may be 2:1. In addition, when the pixel sizes projected on the specimen surface need to be set to 4:1, the ratio of the focal distance of the condenser lens 115 to the focal distance of the imaging lens 125 may be 1:2. Further, when the pixel sizes of the LCOS spatial light modulation element 113 and the imaging element 127 are respectively 6 μm and 3 μm, the numbers of pixels thereof are respectively 2000×1000 and 4000×2000, and device sizes provided on the specimen surface need to be equalized, the ratio of the focal distance of the condenser lens 115 to the focal distance of the imaging lens 125 may be 1:1.

The imaging element 127 captures an image according to the light flux from the specimen surface to generate a captured image. The imaging element 127 is not particularly limited and a known imaging element such as a charge coupled device (CCD) or a complementary metal oxide semiconductor (CMOS) image sensor, for example, may be appropriately used.

Although an imaging element for monochrome imaging may be used as the imaging element 127, it is desirable to use an imaging element for color imaging which has a channel configuration with three channels or more (e.g., an imaging element having a 3-channel configuration with red, green and blue channels, an imaging element having a 4-channel configuration with red, green, blue and infrared, or the like). By capturing images of photoresponsive biomaterials including a luminescent protein or a light-emitting pigment using the imaging element for color imaging, for example, it is possible to image a photoresponsive biomaterial as a certain channel (e.g., B pixel), image light emission from the light-emitting pigment as a certain channel (e.g., R pixel), and the like, as schematically described in FIG. 4. That is, it is possible to image a plurality of wavelength bands using a single imaging element for color imaging.

The configuration of the optical microscope device 10 according to the present embodiment has been described in detail above with reference to FIG. 2 to FIG. 4.

Modified Examples

Subsequently, modified examples of the optical microscope device 10 according to the present embodiment will be described with reference to FIG. 5 to FIG. 10. Hereinafter, differences from the optical microscope device 10 illustrated in FIG. 2 will be mainly described and detailed description of the same components as those of the optical microscope device 10 illustrated in FIG. 2 will be omitted.

[Polarization Compensation Element 131]

Figure 5:
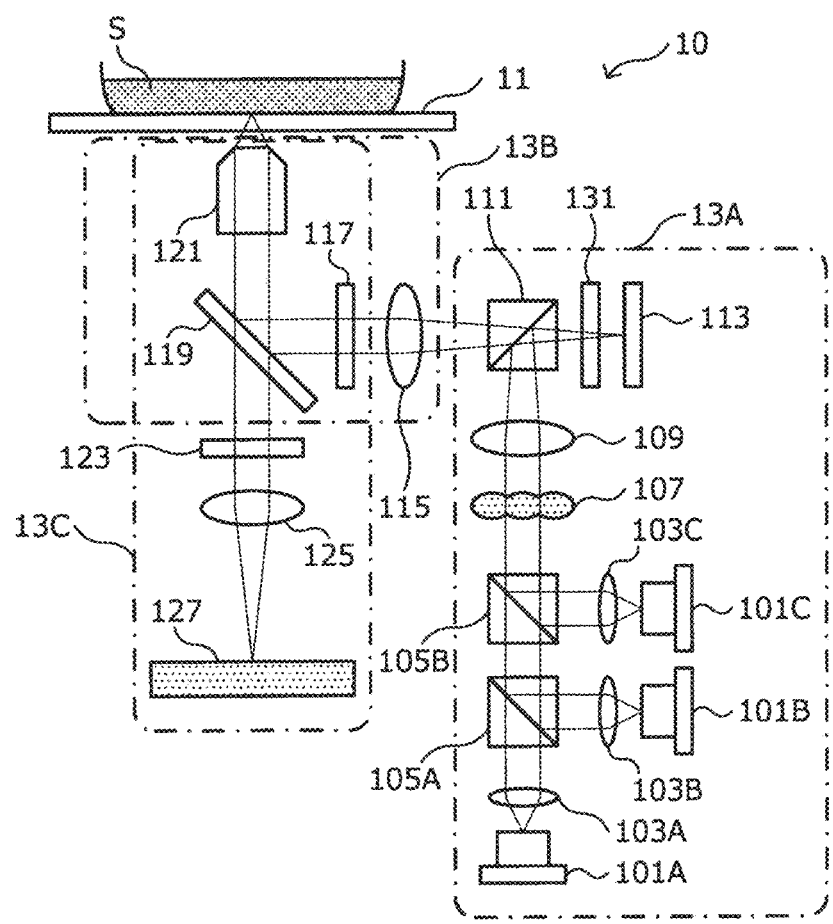
FIG. 5 is an explanatory diagram schematically illustrating another example of the overall configuration of the optical microscope device according to the embodiment.

FIG. 5 is a first modified example of the optical microscope device 10 according to the present embodiment. The optical microscope device 10 according to the first modified example includes a polarization compensation element 131 on a light path between the polarized beam splitter 111 and the LCOS spatial light modulation element 113 in addition to the configuration of the optical microscope device 10 according to the present embodiment illustrated in FIG. 2.

The polarization compensation element 131 is an element that causes a phase difference for incident light to change a polarization state of the incident light. Specifically, first, the polarization compensation element 131 has a first surface (a light passing surface on the side of the polarized beam splitter 111) and a second surface (a light passing surface on the side of the LCOS spatial light modulation element 113) which face each other in the optical axis. In addition, the polarization compensation element 131 is configured to cause phase differences having opposite polarities (opposite directions) and composed of approximately equal absolute values at the time of input of light from the polarized beam splitter 111 (first surface) and at the time of input of light from the LCOS spatial light modulation element 113 (second surface). That is, the polarization compensation element 131 has a phase different property (phase difference symmetry) that does not depend on a light incident direction. Accordingly, it is possible to reduce leaking light to the specimen surface when illumination light is not applied using the sum of a phase difference caused by the polarization compensation element 131 when light from the polarized beam splitter 111 is input, a phase difference occurring at the time of light modulation in the LCOS spatial light modulation element 113, and a phase difference caused by the polarization compensation element 131 when light is input from the LCOS spatial light modulation element 113. As a result, application of illumination light with higher accuracy can be performed, and emphasis of a background is curved in the imaging element 127 so that captured images with higher quality can be acquired.

Meanwhile, in the optical microscope device 10 according to the present embodiment, it is conceived that leaking light to the specimen surface when illumination light is not applied is not generated because the polarized beam splitter 111 is provided between the LCOS spatial light modulation element 113 and the specimen surface. However, in the optical microscope device 10 according to the present embodiment, a polarized light component obliquely input to the polarized beam splitter 111 may be generated because illumination light having a predetermined polarization direction is condensed by the condenser lens 109. Due to such an obliquely input polarized light component, leaking light to the specimen surface when the illumination light is not applied may be generated.

By providing the aforementioned polarization compensation element 131, it is possible to realize site-specific illumination with higher accuracy.

[Speckle Removal Element 133]

Figure 6:
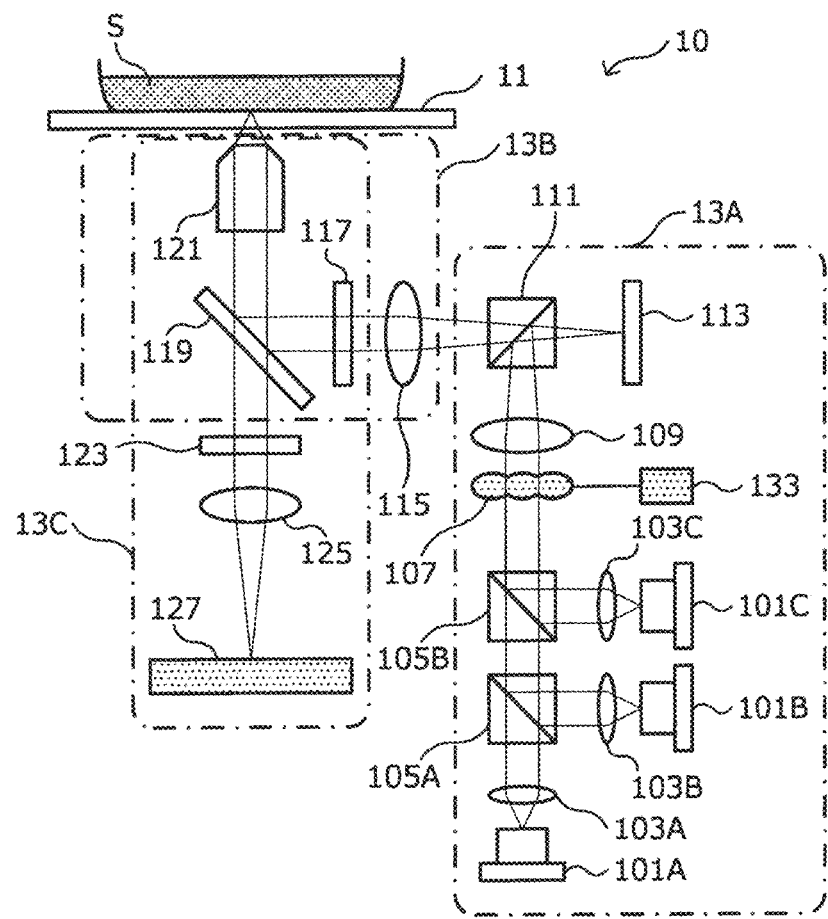
FIG. 6 is an explanatory diagram schematically illustrating another example of the overall configuration of the optical microscope device according to the embodiment.

FIG. 6 is a second modified example of the optical microscope device 10 according to the present embodiment. The optical microscope device 10 according to the second modified example includes a speckle removal element 133 for the integrator 107 in addition to the configuration of the optical microscope device 10 according to the present embodiment illustrated in FIG. 2.

In the optical microscope device 10 according to the present embodiment, speckles are likely to occur in an application plane of illumination light because it is desirable to use a light source capable of emitting light having coherence as the light source 101. Accordingly, it is possible to curb generation of the aforementioned speckles by providing the speckle removal element 133 to vibrate the integrator 107.

The aforementioned speckle removal element 133 may use an arbitrary known member if it can vibrate the integrator 107 to such an extent as alignment of the first illumination optical system 13A is not collapsed, and various piezoelectric elements such as a piezo element, for example, may be used.

It is possible to further improve the uniformity of intensity of application particularly in cases in which a micro area is applied by providing the aforementioned speckle removal element 133.

[Use of Polarization Compensation Element 131 and Speckle Removal Element 133 in Combination]

Figure 7:
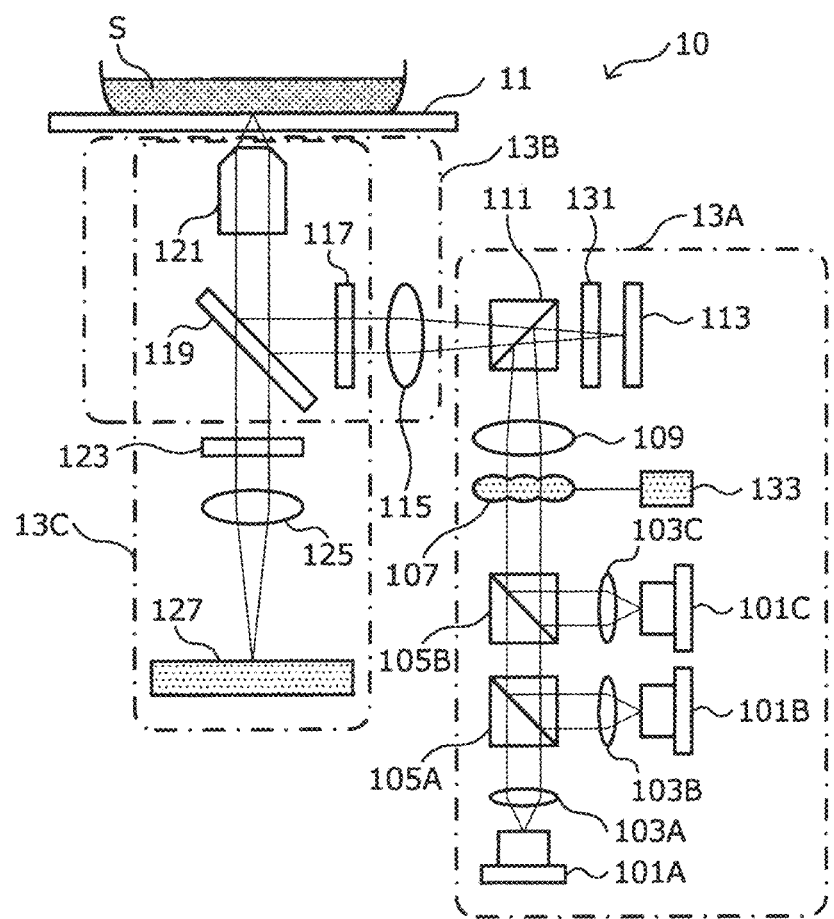
FIG. 7 is an explanatory diagram schematically illustrating another example of the overall configuration of the optical microscope device according to the embodiment.

FIG. 7 is a third modified example of the optical microscope device 10 according to the present embodiment. The optical microscope device 10 according to the third modified example includes both the polarization compensation element 131 and the speckle removal element 133 in addition to the configuration of the optical microscope device 10 according to the present embodiment illustrated in FIG. 2. It is possible to realize site-specific illumination with further improved uniformity of intensity of application and higher accuracy by providing both the polarization compensation element 131 and the speckle removal element 133 as described above.

[Third Illumination Optical System 13D]

Figure 8:
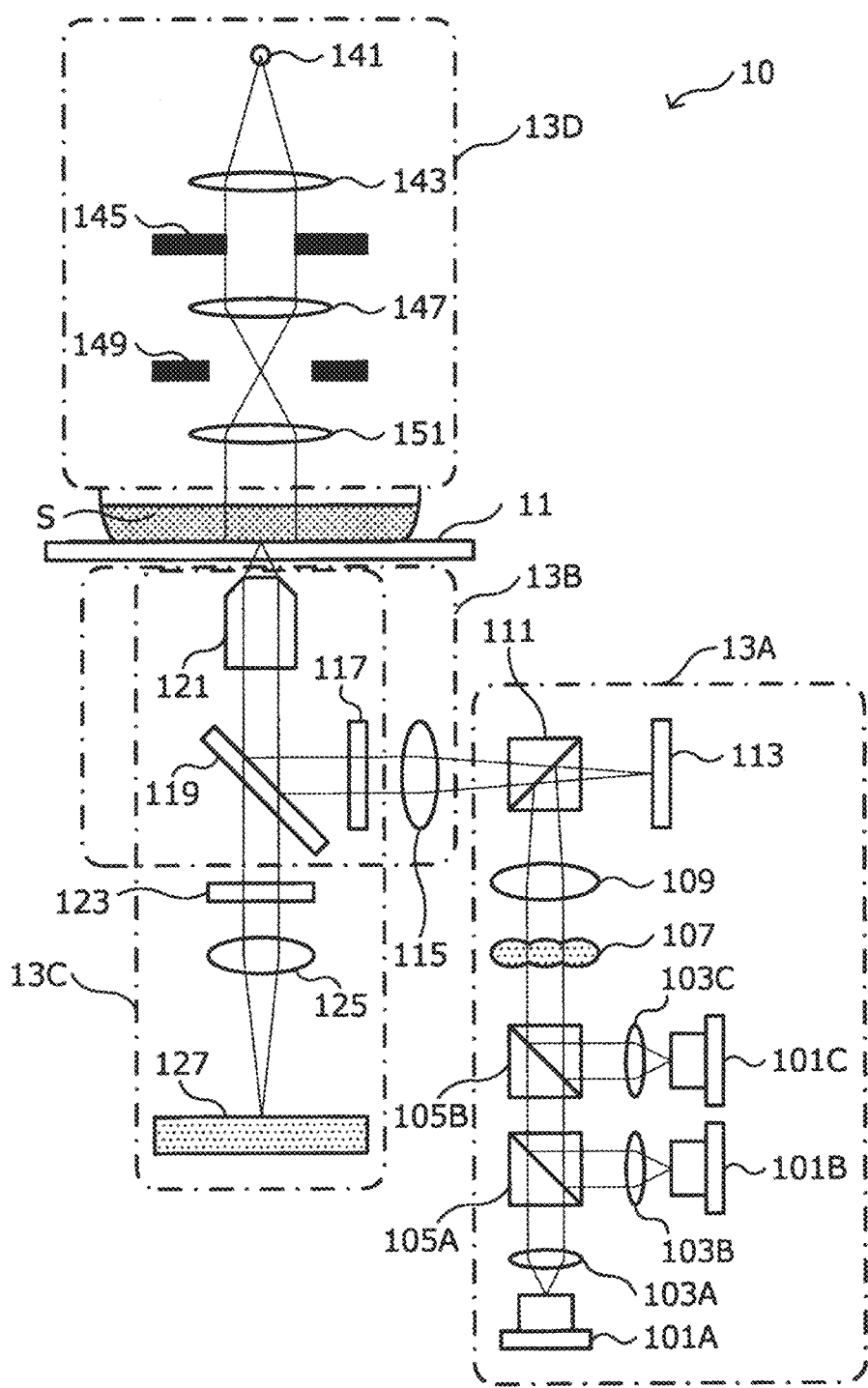
FIG. 8 is an explanatory diagram schematically illustrating another example of the overall configuration of the optical microscope device according to the embodiment.
Figure 9:
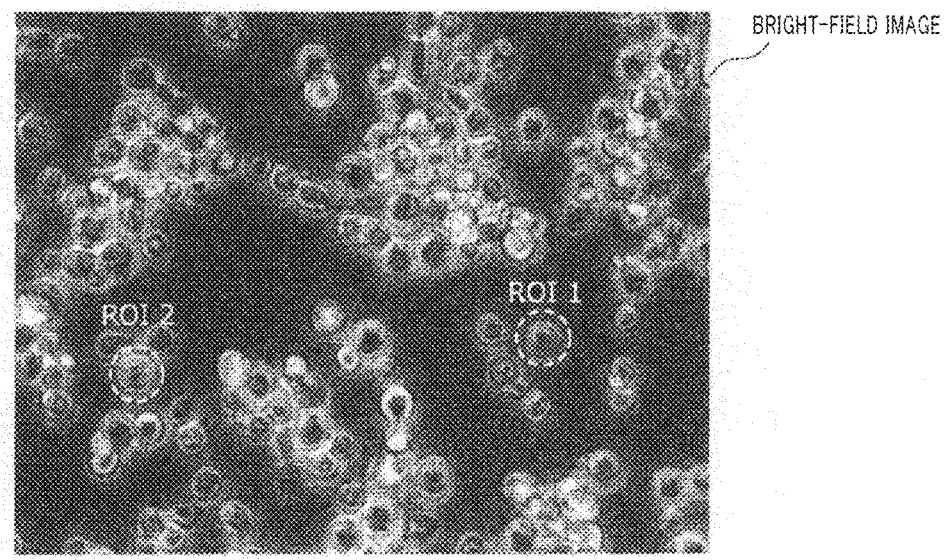
FIG. 9 is an explanatory diagram for describing the optical microscope device according to the embodiment.

FIG. 8 is a fourth modified example of the optical microscope device 10 according to the present embodiment. The optical microscope device 10 according to the fourth modified example includes a third illumination optical system 13D serving as a transmissive illumination optical system in addition to the configuration of the optical microscope device 10 according to the present embodiment illustrated in FIG. 2. Although a fluorescent image or the like is obtained when an observation object has been observed in the configuration of the optical microscope device 10 illustrated in FIG. 2, it is possible to obtain, for example, a bright-field image of an observation object as illustrated in FIG. 9 or a phase different image of the observation object by additionally providing the third illumination optical system 13D as a transmissive illumination optical system. By obtaining a bright-field image or the like of an observation object, a user can more easily select a biomaterial to which the user wants to apply illumination light.

Meanwhile, although FIG. 8 illustrates a case in which the third illumination optical system 13D is provided in addition to the configuration of the optical microscope device 10 according to the present embodiment illustrated in FIG. 2, at least any of the polarization compensation element 131 and the speckle removal element 133 may be further added to the configuration example illustrated in FIG. 8.

The third illumination optical system 13D uniformly illuminates the specimen surface of the specimen S from a side opposite to the first and second illumination optical systems 13A and 13B. As schematically illustrated in FIG. 8, the third illumination optical system 13D includes a second light source 141, a light source lens 143 as an example of a third illumination optical member, a field diaphragm 145, a relay lens 147, an aperture diaphragm 149, and a condenser lens 151.

The second light source 141 is not particularly limited and may use an arbitrary known light source. However, since an observation object of the optical microscope device 10 according to the present embodiment is a photoresponsive biomaterial, it is important to use a light source capable of applying light with a wavelength band to which such a biomaterial does not respond (in other words, light with a wavelength band that does not overlap with the absorption spectrum of photoresponsive biomaterials as illustrated in FIG. 4). As such a light source, light sources with wide wavelength bands, such as a halogen lamp and a white light emitting diode (LED), may be used or light sources with narrow wavelength bands, such as various laser light sources, may be used. However, when a light source with a wide wavelength band is used, it is important to provide optical filters for removing light with wavelength bands overlapping with the absorption spectrum of photoresponsive biomaterials on the light path between the second light source 141 and the specimen surface for the aforementioned reason.

Second illumination light emitted from the second light source 141 is input to the light source lens 143. The light source lens 143 causes the light flux of the second illumination light to be changed to approximately parallel light, and the second illumination light changed to the approximately parallel light is input to the field diaphragm 145. The light source lens 143 may be realized by appropriately using various optical lenses independently or in combination such that a light flux can be collimated.

The field diaphragm 145 adjusts an illumination range of the specimen surface according to the light flux of the second illumination light and is provided a position that is optically conjugate with respect to the specimen surface. The light flux of the second illumination light is input to the relay lens 147 after the application range has been adjusted by the field diaphragm 145. The field diaphragm 145 is not particularly limited and various known diaphragms can be appropriately used.

The relay lens 147 is a lens for converging the second illumination light changed to the approximately parallel light and the aperture diaphragm 149 is a diaphragm for adjusting the brightness of the second illumination light arriving at the specimen surface. The second illumination light that diverges after converged by the relay lens 147 is input to the condenser lens 151 after the brightness thereof has been adjusted by the aperture diaphragm 149. Meanwhile, the relay lens 147 and the aperture diaphragm 149 are not particularly limited and various known optical members can be appropriately used.

The condenser lens 151 is a lens for causing the light flux of the second illumination light diverging after converged by the relay lens 147 to be changed to approximately parallel light again. The condenser lens 151 is not particularly limited and various known condenser lenses can be used. The second illumination light changed to the approximately parallel light by the condenser lens 151 is applied to a part of the specimen surface to illuminate the part of the specimen surface.

As described above, the third illumination optical system 13D illustrated in FIG. 8 constructs a so-called Koehler illumination optical system and uniformly illuminates a part of the specimen S to realize a bright-field image, a phase difference image, or the like.

[Arrangement of First and Second Illumination Optical Systems 13A and 13B on Transmissive Illumination Side]

Figure 10:
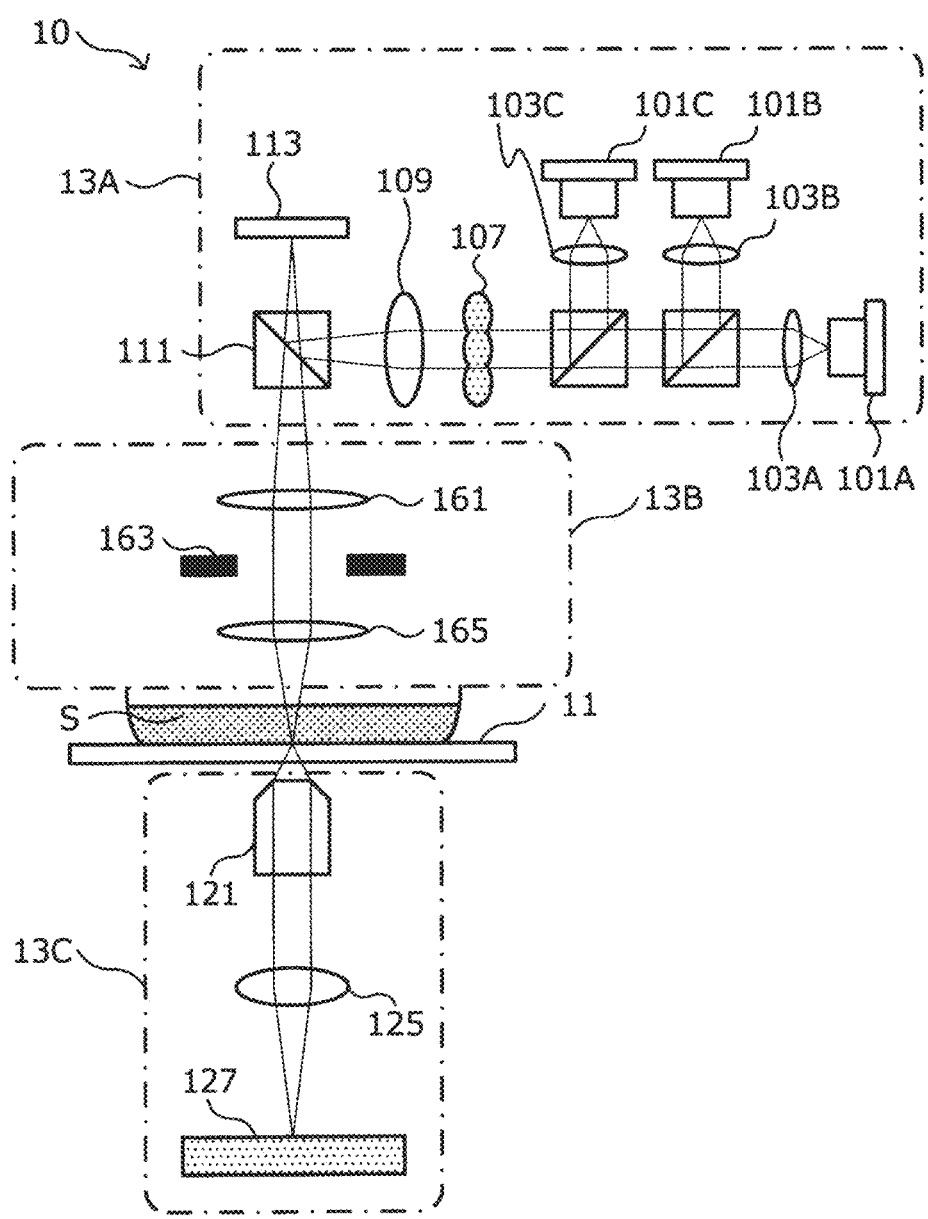
FIG. 10 is an explanatory diagram schematically illustrating another example of the overall configuration of the optical microscope device according to the embodiment.

FIG. 10 is a fifth modified example of the optical microscope device 10 according to the present embodiment. The optical microscope device 10 according to the fifth modified example is configured in such a manner that the first illumination optical system 13A of the optical microscope device 10 according to the present embodiment illustrated in FIG. 2 is placed on a transmissive illumination side and the second illumination optical system 13B is reconfigured in order to appropriately guide the light flux of the first illumination light that is transmissive illumination to the specimen surface. In addition, as a result of arrangement of the first and second illumination optical systems 13A and 13B on the transmissive illumination side, the imaging optical system 13C is also simplified as compared to the optical microscope device 10 illustrated in FIG. 2.

It is possible to actually image a position of illumination light being site-specifically applied and check probability of an application position by arranging the first and second illumination optical systems 13A and 13B on the transmissive illumination side. Accordingly, it is possible to present various types of information including a specimen observation image to a user through a binocular microscope optical system that is not illustrated in FIG. 10. As a result, first, the user need not separate the eyes from an eyepiece to check specimen information, a microscope state, and the like one by one when looking into the eyepiece to look for a specific visual field, and thus operation efficiency can be improved. Meanwhile, as an example of a specimen state, patient information and the like in a pathology slide may be conceived, and as an example of a microscope state, a magnification, and an observation position (XY positions) of an objective lens, and the like may be conceived.

In the present modified example, the first illumination optical system 13A illustrated in FIG. 2 is provided on the transmissive illumination side as it is, as schematically illustrated in FIG. 10. However, when the first illumination optical system 13A is placed, it is important to place the first illumination optical system 13A such that the LCOS spatial light modulation element 113 is positioned to be optically conjugate with respect to the specimen surface of the specimen S. When the LCOS spatial light modulation element 113 and the specimen surface are in an optically conjugate relationship, it is possible to apply illumination light to the specimen surface while an application pattern of the illumination light realized by the LCOS spatial light modulation element 113 is maintained. The light flux of the illumination light in a polarization state controlled by the LCOS spatial light modulation element 113, which has passed through the polarized beam splitter 111, is guided to the second illumination optical system 13B.

Meanwhile, although FIG. 10 illustrates the configuration of the first illumination optical system 13A in the optical microscope device 10 according to the present embodiment illustrated in FIG. 2, at least any of the polarization compensation element 131 or the speckle removal element 133 may be further provided to the configuration example illustrated in FIG. 10.

In addition, in the present modified example, a bright-field image or a phase difference image can be obtained using light other than illumination light with wavelength bands for changing the functions of photoresponsive biomaterials (e.g., light from the light source 101B and/or the light source 101C in the case of photoresponsive biomaterials indicating the absorption spectrum as illustrated in FIG. 4).

The second illumination optical system 13B according to the present modified example includes a relay lens 161, an aperture diaphragm 163 and a condenser lens 165 as examples of a second illumination optical member.

The relay lens 161 is a lens for causing illumination light from the first illumination optical system 13A to be change to approximately parallel light and the aperture diaphragm 163 is a diaphragm for adjusting the brightness of the illumination light arriving at the specimen surface. The illumination light collimated by the relay lens 161 is input to the condenser lens 165 after the brightness thereof has been adjusted by the aperture diaphragm 163. Meanwhile, the relay lens 161 and the aperture diaphragm 163 are not particularly limited and various known optical members can be appropriately used.

The condenser lens 165 is a lens for converging the light flux of the illumination light changed to the approximately parallel light by the relay lens 161 on the specimen surface. The condenser lens 165 is not particularly limited and various known condenser lens can be used. The illumination light converged by the condenser lens 165 is applied to a part of the specimen surface to illuminate the part of the specimen surface.

As described above, the first and second illumination optical systems 13A and 13B illustrated in FIG. 10 constructs a so-called Koehler illumination optical system and uniformly illuminates a part of the specimen S.

In addition, the imaging optical system 13C according to the present modified example includes the objective lens 121, the imaging lens 125, and the imaging element 127. Since these components have almost the same functions and almost the same effects as those illustrated in FIG. 2, detailed description thereof is omitted.

The modified examples of the optical microscope device 10 according to the present embodiment have been described above with reference to FIG. 5 to FIG. 10.

(Concerning Arithmetic Operation Processing Device)

Figure 11:
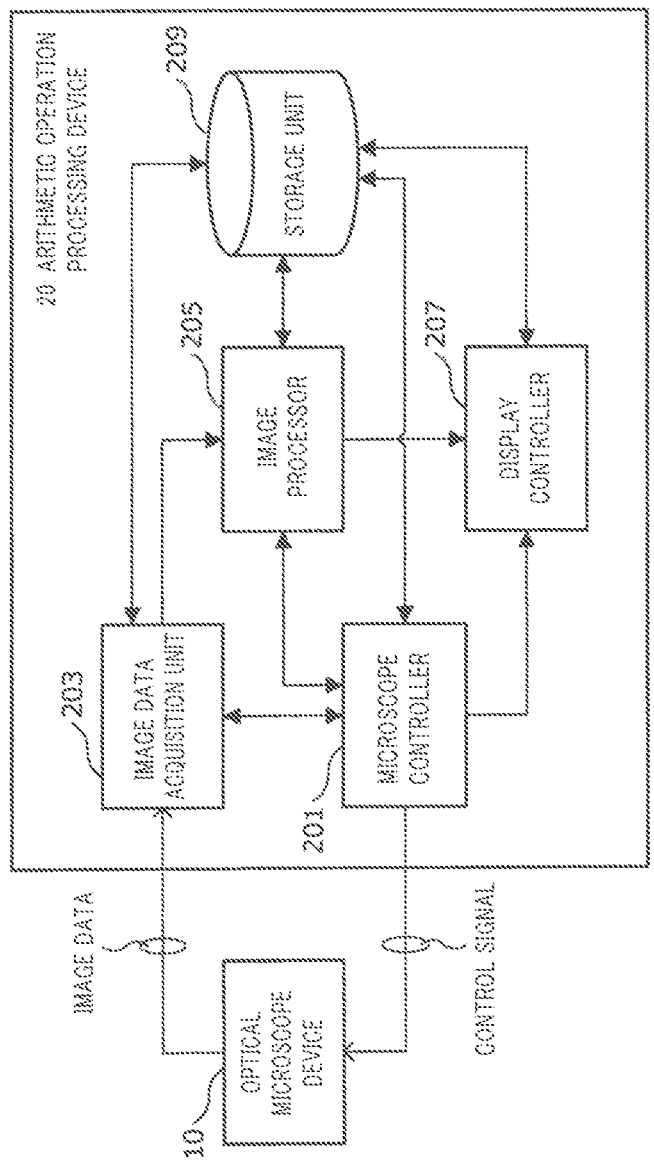
FIG. 11 is a block diagram schematically illustrating an example of a configuration of an arithmetic operation processing device according to the embodiment.
Figure 12:
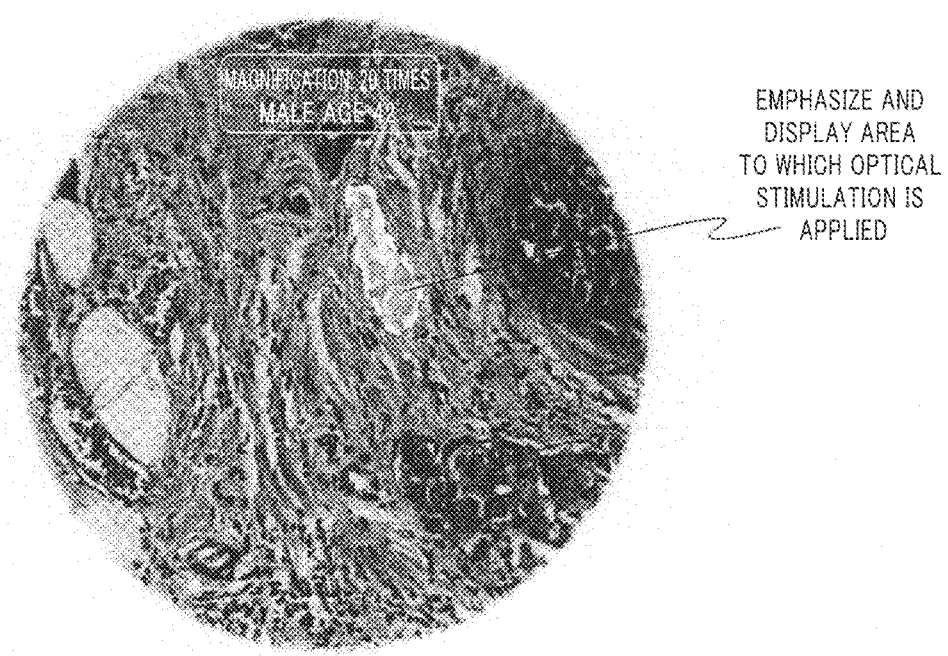
FIG. 12 is an explanatory diagram for describing the arithmetic operation processing device according to the embodiment.
Figure 13:
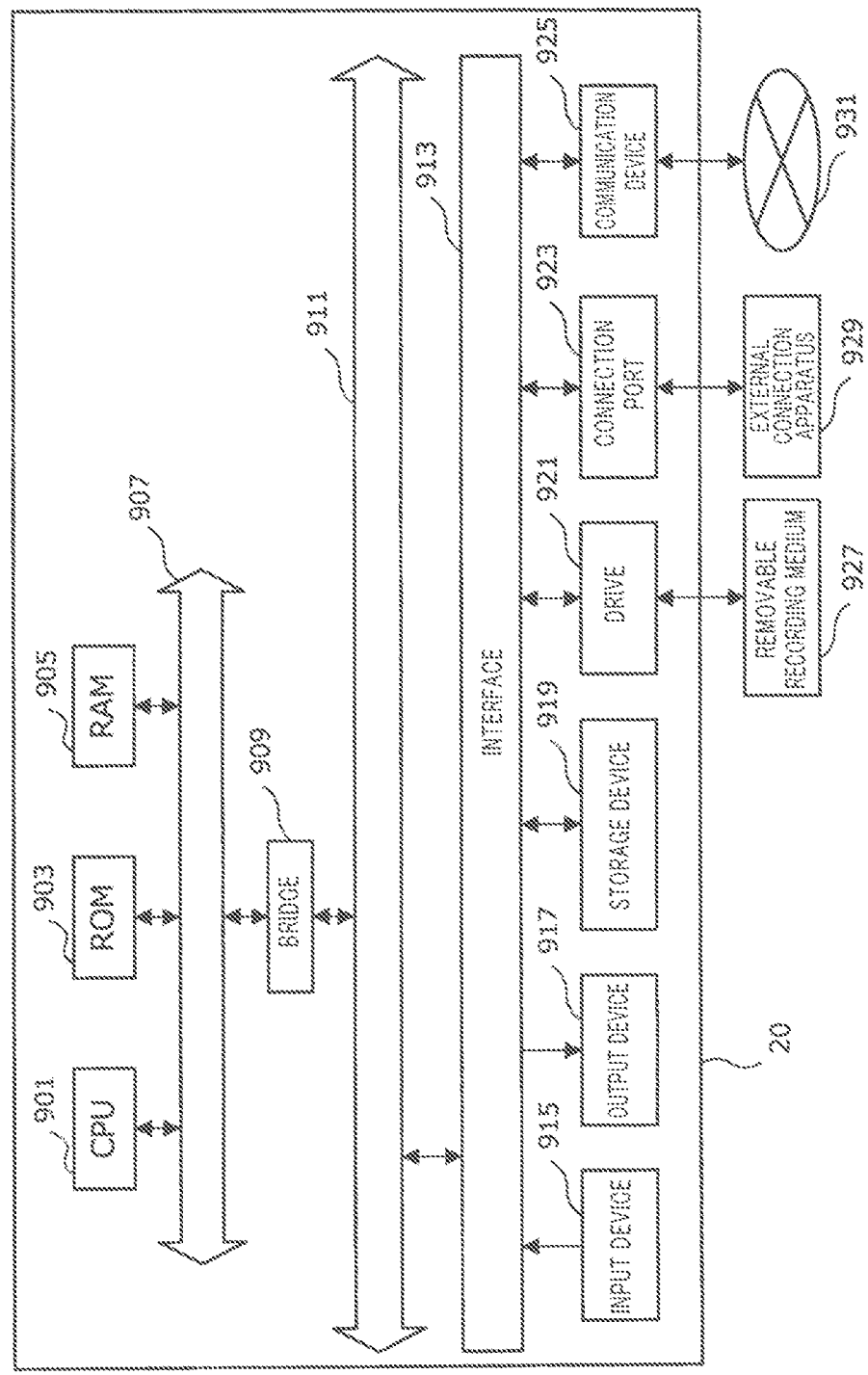
FIG. 13 is a block diagram illustrating an example of a hardware configuration of the arithmetic operation processing device according to the embodiment.

Next, the arithmetic operation processing device included in the optical microscope system according to the present embodiment will be described in detail with reference to FIG. 11 to FIG. 13. FIG. 11 is a block diagram schematically illustrating an example of a configuration of the arithmetic operation processing device according to the present embodiment and FIG. 12 is an explanatory diagram for describing the arithmetic operation processing device according to the present embodiment. FIG. 13 is a block diagram illustrating an example of a hardware configuration of the arithmetic operation processing device according to the present embodiment.

<Concerning Configuration of Arithmetic Operation Processing Device 20>

The arithmetic operation processing device 20 according to the present embodiment may be directly connected to the above-described optical microscope device 10 using a predetermined connection terminal or connected to the optical microscope device 10 through various networks such as the Intranet and Internet in a wired or wireless manner.

As mentioned above, the arithmetic operation processing device 20 transmits predetermined control signals to the optical microscope device 10 to integrally control the operating state of the optical microscope device 10. In addition, the arithmetic operation processing device 20 performs image processing on data of a captured image of a specimen output from the optical microscope device 10 and provides an acquired image processing result to a user of the optical microscope system 1. Further, the arithmetic operation processing device 20 can also control the operating state of the optical microscope device 10 using the acquired image processing result.

As schematically illustrated in FIG. 11, the arithmetic operation processing device 20 mainly includes a microscope controller 201, an image data acquisition unit 203, an image processor 205, a display controller 207, and a storage unit 209.

The microscope controller 201 may be realized, for example, by a central processing unit (CPU), a read only memory (ROM), a random access memory (RAM), an input device, an output device, a communication device, and the like. The microscope controller 201 is a controller that integrally controls the operating state of the optical microscope device 10. The microscope controller 201 controls the operating state of the optical microscope device 10 by outputting a predetermined control signal to the optical microscope device 10 on the basis of a user operation performed by a user, an image processing result of the image processor 205 which will be described later, and the like.

Specifically, the microscope controller 201 can control an on/off state of the light source 101, an application timing of illumination light from the light source 101, intensity of application, an application time, and the like on the basis of a user operation performed by a user, an image processing result of the image processor 205 which will be described later, and the like. In addition, when the optical microscope device 10 includes a plurality of light sources 101, the microscope controller 201 can control an on/off state and the like of each light source 101 as described above, control switching of an application timing of each light source 101, or control an application time of illumination light from each light source 101.

Accordingly, when an observation target is a biomaterial changing their function in response to light which includes a luminescent protein that emits light when illumination light with a predetermined wavelength is applied thereto, a biomaterial labeled with a predetermined light-emitting pigment, or the like, for example, an application time and application intensity of illumination light for causing optical response of the biomaterial and an application time and application intensity of illumination light for causing the luminescent protein or the light-emitting pigment to emit light can be switched with satisfactory timing. As a result, illumination light having a specific wavelength can be applied with low application intensity for a short time in order to cause optical response of the biomaterial or illumination light having a specific wavelength can be applied with high application intensity for a long time in order to cause the luminescent protein or the light-emitting pigment to emit light, and thus the biomaterial can be observed with higher accuracy.

In addition, the microscope controller 201 can realize site-specific illumination by controlling an on/off state of each pixel in the LCOS spatial light modulation element 113 on the basis of a user operation performed by a user, an image processing result of the image processor 205 which will be described later, and the like and realize site-specific and time-specific illumination in which a position to which illumination light is applied is changed by controlling an on/off state of each pixel with a time change. Accordingly, the microscope controller 201 can cause a state of application of illumination light to a specimen to trace a biomaterial.

Furthermore, the microscope controller 201 can also control an imaging position (in other words, setting of a region of interest (ROI)), an imaging timing, an exposure time, and the like in the imaging element 127 on the basis of a user operation performed by a user, an image processing result of the image processor 205 which will be described later. In addition, the microscope controller 201 may have a function of controlling operating states of the stage 11 and the objective lens 121 of the optical microscope device 10.

The image data acquisition unit 203 may be realized, for example, by a CPU, a ROM, a RAM, a communication device, and the like. The image data acquisition unit 203 acquires image data with respect to the specimen surface of the specimen S generated by the optical microscope device 10 from the optical microscope device 10 and outputs the image data to the image processor 205 which will be described later. In addition, the image data acquisition unit 203 may associate time data about a date, time, and the like on/at which the image data is acquired with the acquired image and store it as history information in the storage unit 209 or the like.

The image processor 205 may be realized, for example, by a CPU, a ROM, RAM, and the like. The image processor 205 can perform various types of image processing on image data of a specimen surface transmitted from the image data acquisition unit 203 or acquire various types of information about the specimen by analyzing the image data.

For example, the image processor 205 can perform integration processing using a plurality of pieces of acquired image data to generate brighter image data or a high dynamic range image.

In addition, the image processor 205 can identify a position to which illumination light is applied, identify positions of cells of a biomaterial, or identify a specific position in a cell, such as a core, and the like by analyzing acquired image data using known image recognition processing or the like. Further, the image processor 205 can also identify or evaluate change over time in a specific part of the specimen using such image analysis processing.

In addition, as described above, a specific relationship is established between pixels in the LCOS spatial light modulation element 113 and pixels in the imaging element 127. Accordingly, the image processor 205 can also estimate an application position of illumination light in the imaging element 127 (further, a generated captured image) from an on/off control state of each pixel in the LCOS spatial light modulation element 113.

The image processor 205 can output the aforementioned image processing result and image analysis result to the microscope controller 201. The microscope controller 201 can control the operating state of the optical microscope device 10 on the basis of this image processing result and image analysis result. Accordingly, it is possible to cause the operation of the optical microscope device 10 to follow change over time in a part of a specimen which is concerned to enable observation over time.

In addition, the image processor 205 can also output the aforementioned image processing result and image analysis result to computers including various servers and the like provided outside the arithmetic operation processing device 20, print them on a medium such as paper, and store data in various recording media. Further, the image processor 205 can also cause an image display device such as a display provided in the arithmetic operation processing device 20 or an image display device such as display provided outside the arithmetic operation processing device 20 to display the aforementioned image processing result and image analysis result through the display controller 207 which will be described later.

Specific operation examples in the above-described microscope controller 201 and the image processor 205 will be described again below.

The display controller 207 may be realized, for example, by a CPU, a ROM, a RAM, an output device, a communication device, and the like. The display controller 207 performs display control when an image of a specimen on which the image processor 205 has performed image processing and various types of information related to the image are displayed on an output device such as a display included in the arithmetic operation processing device 20 or an output device provided outside the arithmetic operation processing device 20. Accordingly, the user of the optical microscope system 1 can ascertain various types of information about observed biomaterials on the spot.

The storage unit 209 may be realized, for example, by the RAM included in the arithmetic operation processing device 20 according to the present embodiment, a storage device, or the like. Various databases, software programs, and the like used when the microscope controller 201 and the image processor 205 perform various types of processing are stored in the storage unit 209. In addition, various types of setting information in control processing of the optical microscope device 10 performed by the microscope controller 201, various types of image processing performed by the image processor 205, and the like, various parameters that need to be stored when the arithmetic operation processing device 20 according to the present embodiment perform some processes, an on-going status, and the like are appropriately recorded in the storage unit 209. The microscope controller 201, the image data acquisition unit 203, the image processor 205, the display controller 207, and the like can freely perform data read/write processing for this storage unit 209.

The overall configuration of the arithmetic operation processing device 20 according to the present embodiment has been described above in detail with reference to FIG. 11.

<Specific Examples of Processing Performed by Microscope Controller 201 and Image Processor 205>

Hereinafter, an example of processing performed by the microscope controller 201 and the image processor 205 according to the present embodiment will be described in detail. In the optical microscope system 1 according to the present embodiment, the microscope controller 201 and the image processor 205 of the arithmetic operation processing device 20 can realize various operating states in the optical microscope device 10 in cooperation.

Specific Example-1

For example, a case in which a biomaterial changing its function in response to light which further includes a luminescent protein that emits light when illumination light with a predetermined wavelength is applied thereto, a biomaterial labeled with a predetermined light-emitting pigment, or the like is used as an observation target may be conceived. Here, the microscope controller 201 can control the first illumination optical system 13A such that an application pattern of the illumination light is controlled by the LCOS spatial light modulation element 113 in response to a light-emitting state of the aforementioned specimen. That is, the microscope controller 201 controls the light source 101 that applies illumination light with a wavelength band that causes the luminescent protein or the light-emitting pigment to emit light and controls the state of the LCOS spatial light modulation element 113 to apply the aforementioned illumination light to the entire application range such that the luminescent protein or the light-emitting pigment emits light to generate a captured image obtained by imaging such a light-emitting state. It is possible to site-specifically apply illumination light corresponding to the photoresponsive biomaterial by referring to the acquired captured image.

For example, a user can check the captured image obtained by imaging the light-emitting state or information indicating candidate sites at which biomaterial may be present through image processing of the image processor 205 and perform a predetermined user operation to designate, to the microscope controller 201, an application position of the illumination light for causing the photoresponsive biomaterial to respond. In addition, the image processor 205 may analyze the captured image obtained by imaging the light-emitting state through known image analysis processing and the microscope controller 201 may automatically set an application position of the illumination light for causing the photoresponsive biomaterial to respond.

Furthermore, the microscope controller 201 and the image processor 205 can cooperatively follow only a specific observation target and continuously apply illumination light while alternately repeating application of illumination light for causing the luminescent protein or the light-emitting pigment to emit light and application of site-specific illumination light for causing the photoresponsive biomaterial to respond. In this case, the microscope controller 201 controls the LCOS spatial light modulation element 113 such that the site-specific illumination light traces the biomaterial. This tracing control is particularly effective, for example, when moving specimens such as the nematode and cancer cells and cell proliferation process in which targets move or increase are observed.

Specific Example-2

In addition, a case in which the optical microscope device 10 has an optical system capable of acquiring a bright-field image or a phase difference image, as illustrated in FIG. 8 or FIG. 10, may be conceived. Here, the microscope controller 201 can control the first illumination optical system 13A such that an application pattern of illumination light is controlled by the LCOS spatial light modulation element 113 in response to the acquired bright-field image or phase difference image (i.e., a specimen image). Specifically, the arithmetic operation processing device 20 can present an acquired bright-field image as illustrated in FIG. 9 or a phase difference image to a user such that the user manually selects a position to which the illumination light will be applied, as indicated by ROI1 ROI2, and the like in FIG. 9, for example, and the microscope controller 201 can control the optical microscope device 10 using a selection result of the user. In addition, the image processor 205 can analyze the bright-field image or the phase difference image through known image analysis processing and the microscope controller 201 can automatically set an application position of illumination light for causing the photoresponsive biomaterial to respond and can also cause illumination light to be sequentially applied.

Furthermore, the microscope controller 201 and the image processor 205 can cooperatively follow only a specific observation target and continuously apply illumination light while alternately repeating application of illumination light for acquiring the bright-field image or the phase difference image and application of site-specific illumination light for causing the photoresponsive biomaterial to respond. In this case, the microscope controller 201 controls the LCOS spatial light modulation element 113 such that the site-specific illumination light traces the biomaterial. This tracing control is particularly effective, for example, when moving specimens such as the nematode and cancer cells and cell proliferation process in which targets move or increase are observed.

In addition, the optical system as illustrated in FIG. 10 is realized, a position of site-specifically applied illumination light can be actually imaged and probability of the application position can be confirmed. Here, the image processor 205 can also cause various types of information using characters, figures, and the like to be overlaid on a captured image of a specimen in cooperation with the display controller 207. Accordingly, it is possible to display an area of the specimen to which optical stimulation is applied in an emphasized manner, as schematically illustrated in FIG. 12, for example, cause information about the specimen and the state of the optical microscope device to overlap, and display a part corresponding to specific cells or tissues in an emphasized manner. By directly presenting this image to the user, first, the user need not separate the eyes from an eyepiece to check specimen information and the state of the optical microscope device one by one when looking into the eyepiece to look for a specific visual field, and thus operation efficiency of the user can be further improved and auxiliary information can be obtained from the arithmetic operation processing device 20. For example, when pathological diagnosis is performed, the arithmetic operation processing device 20 can also support pathological diagnosis by performing auxiliary diagnosis using AI or the like through an image captured by the imaging optical system while observing pathology slides through a microscope and displaying parts considered as cancer cells (parts corresponding to specific cells or tissues) in an emphasized manner.

Specific Example-3

As described above, it is important to observe changes as a result of application of site-specific illumination light to photoresponsive biomaterials. For example, there are cases in which interaction such as movement of a certain muscle when light has been applied to specific neurons is observed, how the rhythm of pulsation changes when light has been applied to specific myocardial cells is observed, and how an ion flow changes when light has been applied to specific cells is observed. The aforementioned observation can be performed by the microscope controller 201 and the image processor 205 cooperatively acquiring a bright-field image or a phase difference image and performing image analysis on the acquired image. In addition, luminescence imaging using light source wavelengths that do not cause luminescent proteins to respond is also effective for the aforementioned observation. For example, the microscope controller 201 and the image processor 205 can identify interaction of cells or quantitatively identify pulsation change by acquiring a phase difference image and analyzing movement of muscle cells after application of site-specific light or while performing application of light.

An example of processing performed by the microscope controller 201 and the image processor 205 according to the present embodiment has been specifically described above.

An example of the functions of the arithmetic operation processing device 20 according to the present embodiment has been illustrated. Each of the aforementioned components may be configured using a universal member or circuit or configured as hardware specialized for the function of each component. In addition, the function of each component may be executed by a CPU or the like. Accordingly, a configuration to be used may be appropriately modified in response to a technical level when the present embodiment is embodied.

Meanwhile, a computer program for realizing each function of the above-described arithmetic operation processing device according to the present embodiment may be produced and mounted in a personal computer or the like. In addition, a computer-readable recording medium in which the computer program is stored can also be provided. The recording medium may be, for example, a magnetic disk, an optical disc, a magneto-optical disk, a flash memory, or the like. Further, the aforementioned computer program may be distributed through a network, for example, without using a recording medium.

<Concerning Hardware Configuration of Arithmetic Operation Processing Device>

Next, a hardware configuration of the arithmetic operation processing device 20 according to an embodiment of the present disclosure will be described in detail with reference to FIG. 13. FIG. 13 is a block diagram for describing the hardware configuration of the arithmetic operation processing device 20 according to an embodiment of the present disclosure.

The arithmetic operation processing device 20 mainly includes a CPU 901, a ROM 903, and a RAM 905. In addition, the arithmetic operation processing device 20 further includes a host bus 907, a bridge 909, an external bus 911, an interface 913, an input device 915, an output device 917, a storage device 919, a drive 921, a connection port 923, and a communication device 925.

The CPU 901 serves as an arithmetic operation processing device and a control device and controls all or some operations in the arithmetic operation processing device 20 according to various programs recorded in the ROM 903, the RAM 905, the storage device 919 or a removable recording medium 927. The ROM 903 stores programs, arithmetic operation parameters and the like used by the CPU 901. The RAM 905 primarily stores programs, parameters appropriately changing in execution of programs, and the like used by the CPU 901. These are connected to each other through the host bus 907 configured as an internal bus such as a CPU bus.

The host bus 907 is connected to the external bus 911 such as a peripheral component interconnect/interface (PCI) bus through the bridge 909.

The input device 915 is an operation means operated by a user, such as a mouse, a keyboard, a touch panel, a button, a switch, and a lever, for example. In addition, the input device 915 may be, for example, a remote control means (so-called remote controller) using infrared rays or other radio waves or an external connection apparatus 929 such as a cellular phone or a PDA corresponding to operation of the arithmetic operation processing device 20. Further, the input device 915 may be composed of, for example, an input control circuit or the like which generates an input signal on the basis of information input by the user using the aforementioned operation means and outputs the input signal to the CPU 901. The user can input various types of data or instruct processing operation with respect to the arithmetic operation processing device 20 by operating the input device 915.

The output device 917 is configured as a device capable of visually or acoustically notifying a user of acquired information. As such a device, there are display devices such as a CRT display device, a liquid crystal display device, a plasma display device, an EL display device and a lamp, audio output devices such as a speaker and a headphone, a printer device, a cellular phone, a facsimile, and the like. The output device 917 may output, for example, results obtained by various types of processing performed by the arithmetic operation processing device 20. Specifically, a display device displays results obtained by various types of processing performed by the arithmetic operation processing device 20 as text or images. On the other hand, an audio output device converts an audio signal composed of reproduced voice data, audio data, and the like into an analog signal and outputs the analog signal.

The storage device 919 is a device for data storage, which is configured as an example of a storage unit of the arithmetic operation processing device 20. The storage device 919 may be configured as, for example, a magnetic storage disk such as a hard disk drive (HDD), a semiconductor storage device, an optical storage device, a magneto-optical storage device, or the like. The storage device 919 stores programs and various types of data executed by the CPU 901, various types of data acquired from the outside, and the like.

The drive 921 is a reader/writer for recording media and is embedded in the arithmetic operation processing device 20 or attached to the outside thereof. The drive 921 reads information recorded in the removable recording medium 927 inserted therein, such as a magnetic disk, an optical disc, a magneto-optical disk, or a semiconductor memory, and outputs the read information to the RAM 905. In addition, the drive 921 may write records in the removable recording medium 927 inserted therein, such as a magnetic disk, an optical disc, a magneto-optical disk, or a semiconductor memory. The removable recording medium 927 may be, for example, DVD media, HD-DVD media, Blu-ray (registered trademark) media, or the like. Further, the removable recording medium 927 may be Compact Flash (CF) (registered trademark), a flash memory, a secure digital (SD) memory card, or the like. In addition, the removable recording medium 927 may be, for example, an integrated circuit (IC) card having a contactless type IC chip mounted thereon, an electronic apparatus, or the like.

The connection port 923 is a port for direct connection to the information arithmetic operation processing device 20. As an example of the connection port 923, there are a universal serial bus (USB) port, an IEEE 1394 port, a small computer system interface (SCSI) port, and the like. Another example of the connection port 923, there are an RS-232C port, an optical audio terminal, high-definition multimedia interface (HDMI) (registered trademark) port, and the like. The arithmetic operation processing device 20 directly acquires various types of data from the external connection apparatus 929 or provides various types of data to the external connection apparatus 929 by connecting the external connection apparatus 929 to the connection port 923.

The communication device 925 is a communication interface configured as a communication device or the like for connecting to a communication network 931. The communication device 925 may be, for example, a wired or wireless local area network (LAN), Bluetooth (registered trademark), a communication card for wireless USB (WUSB), or the like. In addition, the communication device 925 may be a router for optical communication, a router for asymmetric digital subscriber line (ADSL), a modem for various communications, or the like. This communication device 925 can transmit/receive signals and the like, for example, according to a predetermined protocol such as TCP/IP between, for example, the Internet and other communication apparatuses. In addition, the communication network 931 connected to the communication device 925 is configured as a network and the like connected in a wired or wireless manner and may be, for example, the Internet, a home LAN, infrared communication, radio wave communication, satellite communication, or the like.

An example of the hardware configuration capable of realizing the functions of the arithmetic operation processing device 20 according to an embodiment of the present disclosure has been illustrated above. Each of the aforementioned components may be configured using a universal member or configured as hardware specialized for the function of each component. Accordingly, a hardware configuration to be used may be appropriately changed in response to a technical level when the present embodiment is embodied.

The optical microscope system 1 including the optical microscope device 10 and the arithmetic operation processing device 20 according to the present embodiment has been described above in detail with reference to FIG. 1 to FIG. 13.

Meanwhile, the optical microscope system 1 including the above-described optical microscope device 10 and the arithmetic operation processing device 20 can also be applied to various projectors including a projector for operation.

(Concerning Specimen Observation Method)

Hereinafter, an example of a flow of a specimen observation method using the above-described optical microscope device 10 according to the present embodiment will be briefly described.

The specimen observation method according to the present embodiment includes (a) causing a light source that emits illumination light having a predetermined polarization direction and illuminating a specimen including photoresponsive biomaterials to emit the illumination light and causing the illumination light to be uniformly applied to an LCOS spatial light modulation element through a first illumination optical member, (b) with respect to the illumination light having a polarization state controlled by the LCOS spatial light modulation element, controlling, by a polarization optical element, a transmission state of the illumination light directed from the LCOS spatial light modulation element to the specimen in response to the polarization state of the illumination light, (c) causing a second illumination optical member to image a light flux of the illumination light from the polarization optical element on the specimen surface, and (d) imaging a specimen surface by an imaging optical system including an imaging optical member and an imaging element.

It is possible to observe even a specimen including photoresponsive biomaterials using illumination with higher accuracy by observing the specimen through the above-described flow.

Although suitable embodiments of the present disclosure have been described above in detail with reference to the attached drawings, the technical scope of the present disclosure is not limited to such examples. It will be apparent to those skilled in the art that various modification examples and amendment examples are possible without departing from the scope of the technical spirit described in claims, and it will be understood that these examples also belong to the technical scope of the present disclosure.

Furthermore, the effects described in this specification are explanatory or illustrative and are not limitative. That is, the technology according to the present disclosure may obtain other effects apparent to those skilled in the art from this specification in addition to or instead of the aforementioned effects.

Meanwhile, the following configurations also belong to the technical scope of the present disclosure.

(1)

An optical microscope device including: a first illumination optical system including a light source that emits illumination light for illuminating a specimen including biomaterials changing their functions in response to light, a liquid crystal on silicon (LCOS) spatial light modulation element that controls a polarization state of the illumination light, a first illumination optical member that uniformly illuminates the LCOS spatial light modulation element, and a polarization optical element that controls a transmission state of the illumination light directed to the specimen from the LCOS spatial light modulation element in response to the polarization state of the illumination light; a second illumination optical system including a second illumination optical member that images a light flux from the first illumination optical system on a specimen surface; and an imaging optical system for imaging the specimen surface, which includes an imaging optical member and an imaging element.

(2)

The optical microscope device according to (1), wherein the first illumination optical system further includes a polarization compensation element.

(3)

The optical microscope device according to (1) or (2), wherein the first illumination optical system further includes a speckle removal element.

(4)

The optical microscope device according to any one of (1) to (3), wherein the first illumination optical system and the second illumination optical system site-specifically apply the illumination light to the specimen surface.

(5)

The optical microscope device according to any one of (1) to (4), wherein the first illumination optical system and the second illumination optical system time-specifically apply the illumination light to the specimen surface.

(6)

The optical microscope device according to any one of (1) to (5), wherein the specimen includes the biomaterials containing a luminescent protein that emits light when illumination light with a predetermined wavelength is applied thereto or the biomaterials labeled with a predetermined light-emitting pigment.

(7)

The optical microscope device according to (6), wherein the first illumination optical system includes a plurality of light sources, and the luminescent protein emits light or the light-emitting pigment is excited to emit light according to the illumination light applied from at least any of the plurality of light sources.

(8)

The optical microscope device according to (6) or (7), wherein, in the first illumination optical system, an application pattern of the illumination light is controlled by the LCOS spatial light modulation element in response to a light-emitting state of the specimen.

(9)

The optical microscope device according to any one of (1) to (5), further including a second illumination optical system including a second light source that applies second illumination light to the specimen surface and a third illumination optical member that uniformly illuminates the specimen surface.

(10)

The optical microscope device according to (9), wherein, in the first illumination optical system, an application pattern of the illumination light is controlled by the LCOS spatial light modulation element in response to a specimen image obtained by the third illumination optical system.

(11)

The optical microscope device according to any one of (1) to (5), wherein the first illumination optical system and the second illumination optical system are arranged as transmissive illumination with respect to the imaging optical system.

(12)

The optical microscope device according to (11), wherein, in the first illumination optical system, an application pattern of the illumination light is controlled by the LCOS spatial light modulation element in response to a specimen image obtained by the first illumination optical system and the second illumination optical system.

(13)

The optical microscope device according to (8), wherein, in the first illumination optical system, the LCOS spatial light modulation element is controlled such that the LCOS spatial light modulation element causes the site-specific illumination light to trace the biomaterials.

(14)

The optical microscope device according to (10), wherein, in the first illumination optical system, the LCOS spatial light modulation element is controlled such that the LCOS spatial light modulation element causes the site-specific illumination light to trace the biomaterials.

(15)

The optical microscope device according to (12), wherein, in the first illumination optical system, the LCOS spatial light modulation element is controlled such that the LCOS spatial light modulation element causes the site-specific illumination light to trace the biomaterials.

(16)

An optical microscope device including: a first illumination optical system including a light source that emits illumination light for illuminating a specimen, a liquid crystal on silicon (LCOS) spatial light modulation element that controls a polarization state of the illumination light, a first illumination optical member that uniformly illuminates the LCOS spatial light modulation element, and a polarization optical element that controls a transmission state of the illumination light directed to the specimen from the LCOS spatial light modulation element in response to the polarization state of the illumination light; a second illumination optical system including a second illumination optical member that images a light flux from the first illumination optical system on a specimen surface; and an imaging optical system for imaging the specimen surface, which includes an imaging optical member and an imaging element.

(17)

An optical microscope system including: an optical microscope device including a first illumination optical system including a light source that emits illumination light for illuminating a specimen including biomaterials changing their functions in response to light, a liquid crystal on silicon (LCOS) spatial light modulation element that controls a polarization state of the illumination light, a first illumination optical member that uniformly illuminates the LCOS spatial light modulation element, and a polarization optical element that controls a transmission state of the illumination light directed to the specimen from the LCOS spatial light modulation element in response to the polarization state of the illumination light, a second illumination optical system including a second illumination optical member that images a light flux from the first illumination optical system on a specimen surface, and an imaging optical system for imaging the specimen surface, which includes an imaging optical member and an imaging element; a controller that controls an operating state of the optical microscope device; and an image processor that performs image processing on a captured image of the specimen generated by the imaging element.

(18)

The optical microscope system according to (17), wherein the image processor identifies change in the biomaterials according to light application by performing image processing on the captured image.

(19)

The optical microscope system according to (18), wherein the controller controls an operating state of the optical microscope device in response to the change in the biomaterials identified by the image processor and causes a state of application of the illumination light to the specimen to trace the biomaterials.

(20)

The optical microscope system according to any one of (17) to (19), wherein the image processor controls at least any of information about the specimen and information about a state of the optical microscope device to be overlaid and displayed on the captured image of the specimen.

REFERENCE SIGNS LIST

1 Optical microscope system
10 Optical microscope device
13A First illumination optical system
13B Second illumination optical system
13C Imaging optical system
13D Third illumination optical system
20 Arithmetic operation processing device
101 Light source
103 Coupling lens
105 Dichroic prism
107 Integrator
109, 115, 151, 165 condenser lens
111 Polarized beam splitter
113 LCOS spatial light modulation element
117, 123 Band pass filter
119 Dichroic mirror
121 Objective lens
125 Imaging lens
127 Imaging element
131 Polarization compensation element
133 Speckle removal element
141 Second light source
143 Light source lens
145 Field diaphragm
147, 161 Relay lens
149, 163 Aperture diaphragm
201 Microscope controller
203 Image data acquisition unit
205 Image processor
207 Display controller
209 Storage unit

The invention claimed is:

1. An optical microscope device comprising:
a first illumination optical system including a light source that emits illumination light for illuminating a specimen including biomaterials changing functions in response to light, a liquid crystal on silicon (LCOS) spatial light modulation element that controls a polarization state of the illumination light, a first illumination optical member that uniformly illuminates the LCOS spatial light modulation element, and a polarization optical element that controls a transmission state of the illumination light directed to the specimen from the LCOS spatial light modulation element in response to the polarization state of the illumination light;

a second illumination optical system including a second illumination optical member that images a light flux from the first illumination optical system on a specimen surface;

an imaging optical system for imaging the specimen surface, which includes an imaging optical member and an imaging element; and a third illumination optical system including a second light source that applies second illumination light to the specimen surface and a third illumination optical member that uniformly illuminates the specimen surface, wherein, in the first illumination optical system, an application pattern of the illumination light is controlled by the LCOS spatial light modulation element in response to a specimen image obtained by the third illumination optical system.

2. The optical microscope device according to claim 1, wherein the first illumination optical system further includes a polarization compensation element.

3. The optical microscope device according to claim 1, wherein the first illumination optical system further includes a speckle removal element.

4. The optical microscope device according to claim 1, wherein the first illumination optical system and the second illumination optical system site-specifically apply the illumination light to the specimen surface.

5. The optical microscope device according to claim 4, wherein the first illumination optical system and the second illumination optical system time-specifically apply the illumination light to the specimen surface.

6. The optical microscope device according to claim 1, wherein the specimen includes the biomaterials containing a luminescent protein that emits light when illumination light with a predetermined wavelength is applied or the biomaterials labeled with a predetermined light-emitting pigment.

7. The optical microscope device according to claim 6, wherein the first illumination optical system includes a plurality of light sources, wherein the luminescent protein emits light or the light-emitting pigment is excited to emit light according to the illumination light applied from at least any of the plurality of light sources.

8. The optical microscope device according to claim 7, wherein, in the first illumination optical system, an application pattern of the illumination light is controlled by the LCOS spatial light modulation element in response to a light-emitting state of the specimen.

9. The optical microscope device according to claim 8, wherein, in the first illumination optical system, the LCOS spatial light modulation element is controlled such that the LCOS spatial light modulation element causes the site-specific illumination light to trace the biomaterials.

10. The optical microscope device according to claim 1, wherein the first illumination optical system and the second illumination optical system are arranged as transmissive illumination with respect to the imaging optical system.

11. The optical microscope device according to claim 1, wherein, in the first illumination optical system, the LCOS spatial light modulation element is controlled such that the LCOS spatial light modulation element causes the site-specific illumination light to trace the biomaterials.

12. An optical microscope device comprising:
a first illumination optical system including a light source that emits illumination light for illuminating a specimen including biomaterials changing functions in response to light, a liquid crystal on silicon (LCOS) spatial light modulation element that controls a polarization state of the illumination light, a first illumination optical member that uniformly illuminates the LCOS spatial light modulation element, and a polarization optical element that controls a transmission state of the illumination light directed to the specimen from the LCOS spatial light modulation element in response to the polarization state of the illumination light;

a second illumination optical system including a second illumination optical member that images a light flux from the first illumination optical system on a specimen surface; and an imaging optical system for imaging the specimen surface, which includes an imaging optical member and an imaging element, wherein the first illumination optical system and the second illumination optical system are arranged as transmissive illumination with respect to the imaging optical system, and wherein, in the first illumination optical system, an application pattern of the illumination light is controlled by the LCOS spatial light modulation element in response to a specimen image obtained by the first illumination optical system and the second illumination optical system.

13. The optical microscope device according to claim 12, wherein, in the first illumination optical system, the LCOS spatial light modulation element is controlled such that the LCOS spatial light modulation element causes the site-specific illumination light to trace the biomaterials.

14. An optical microscope device comprising:
a first illumination optical system including a light source that emits illumination light for illuminating a specimen, a liquid crystal on silicon (LCOS) spatial light modulation element that controls a polarization state of the illumination light, a first illumination optical member that uniformly illuminates the LCOS spatial light modulation element, and a polarization optical element that controls a transmission state of the illumination light directed to the specimen from the LCOS spatial light modulation element in response to the polarization state of the illumination light;

a second illumination optical system including a second illumination optical member that images a light flux from the first illumination optical system on a specimen surface;

an imaging optical system for imaging the specimen surface, the imaging optical system including an imaging optical member and an imaging element; and a third illumination optical system including a second light source that applies second illumination light to the specimen surface and a third illumination optical member that uniformly illuminates the specimen surface, wherein, in the first illumination optical system, an application pattern of the illumination light is controlled by the LCOS spatial light modulation element in response to a specimen image obtained by the third illumination optical system.

15. An optical microscope system comprising:
an optical microscope device including:
a first illumination optical system including a light source that emits illumination light for illuminating a specimen including biomaterials changing their functions in response to light, a liquid crystal on silicon (LCOS) spatial light modulation element that controls a polarization state of the illumination light, a first illumination optical member that uniformly illuminates the LCOS spatial light modulation element, and a polarization optical element that controls a transmission state of the illumination light directed to the specimen from the LCOS spatial light modulation element in response to the polarization state of the illumination light; a second illumination optical system including a second illumination optical member that images a light flux from the first illumination optical system on a specimen surface; and an imaging optical system for imaging the specimen surface, the imaging optical system including an imaging optical member and an imaging element;

a controller that controls an operating state of the optical microscope device; and an image processor that performs image processing on a captured image of the specimen generated by the imaging element, wherein the image processor identifies change in the biomaterials according to light application by performing image processing on the captured image.

16. The optical microscope system according to claim 15, wherein the controller controls an operating state of the optical microscope device in response to the change in the biomaterials identified by the image processor and causes a state of application of the illumination light to the specimen to trace the biomaterials.

17. An optical microscope system comprising:
an optical microscope device including:
a first illumination optical system including a light source that emits illumination light for illuminating a specimen including biomaterials changing their functions in response to light, a liquid crystal on silicon (LCOS) spatial light modulation element that controls a polarization state of the illumination light, a first illumination optical member that uniformly illuminates the LCOS spatial light modulation element, and a polarization optical element that controls a transmission state of the illumination light directed to the specimen from the LCOS spatial light modulation element in response to the polarization state of the illumination light; a second illumination optical system including a second illumination optical member that images a light flux from the first illumination optical system on a specimen surface; and an imaging optical system for imaging the specimen surface, the imaging optical system including an imaging optical member and an imaging element;

a controller that controls an operating state of the optical microscope device; and an image processor that performs image processing on a captured image of the specimen generated by the imaging element, wherein the image processor controls at least any of information about the specimen and information about a state of the optical microscope device to be overlaid and displayed on the captured image of the specimen.

* * * * *